(12) United States Patent
Shih et al.

(10) Patent No.: US 10,849,052 B2
(45) Date of Patent: Nov. 24, 2020

(54) SYSTEMS AND METHODS FOR CELL (RE)SELECTION AND CELL BARRING

(71) Applicant: FG Innovation Company Limited, Tuen Mun (HK)

(72) Inventors: Mei-Ju Shih, Hsinchu (TW); Chie-Ming Chou, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/153,748

(22) Filed: Oct. 6, 2018

(65) Prior Publication Data

US 2019/0110244 A1  Apr. 11, 2019

Related U.S. Application Data

(60) Provisional application No. 62/568,885, filed on Oct. 6, 2017.

(51) Int. Cl.
| | |
|---|---|
| *H04W 48/16* | (2009.01) |
| *H04W 76/27* | (2018.01) |
| *H04W 48/08* | (2009.01) |
| *H04W 8/18* | (2009.01) |
| *H04W 48/02* | (2009.01) |

(Continued)

(52) U.S. Cl.
CPC .......... *H04W 48/16* (2013.01); *H04W 48/08* (2013.01); *H04W 76/27* (2018.02); *H04W 8/186* (2013.01); *H04W 48/02* (2013.01); *H04W 48/12* (2013.01); *H04W 48/20* (2013.01); *H04W 84/042* (2013.01)

(58) Field of Classification Search
None
See application file for complete search history.

(56) References Cited

U.S. PATENT DOCUMENTS

| | | |
|---|---|---|
| 2006/0035662 A1 | 2/2006 | Jeong et al. |
| 2017/0142566 A1* | 5/2017 | Lin ........................ H04W 36/08 |

(Continued)

FOREIGN PATENT DOCUMENTS

| | | |
|---|---|---|
| CN | 102625418 A | 8/2012 |
| CN | 103052110 A | 4/2013 |
| WO | 2015085480 A | 6/2015 |

OTHER PUBLICATIONS

3GPP TS 36.304, "3rd Generation Partnership Project; Technical Specification Group Radio Access Network; Evolved Universal Terrestrial Radio Access (E-UTRA); User Equipment (UE) procedures in idle mode (Release 13)," V13.7.0, Sep. 2017 Section 5.3.1, 5.2.4.4.

*Primary Examiner* — Charles C Jiang
*Assistant Examiner* — Saad Khawar
(74) *Attorney, Agent, or Firm* — ScienBiziP, P.C.

(57) ABSTRACT

A user equipment (UE) includes one or more non-transitory computer-readable media having computer-executable instructions embodied thereon; at least one processor coupled to the one or more non-transitory computer-readable media, and configured to execute the computer-executable instructions to: receive, by reception circuitry, barred cell (cellBarred) status information through system information; perform cell selection, when a cell is non-campable for the UE based on the cellBarred status information; wherein the cellBarred status information indicates one or more core networks the cell is capable of connecting to.

12 Claims, 13 Drawing Sheets

(51) Int. Cl.
  *H04W 48/12* (2009.01)
  *H04W 48/20* (2009.01)
  *H04W 84/04* (2009.01)

(56) References Cited

U.S. PATENT DOCUMENTS

2019/0053129 A1\* 2/2019 Kim ..................... H04W 52/38
2019/0059045 A1\* 2/2019 Huang-Fu ............. H04W 24/10
2019/0261264 A1\* 8/2019 Lou ....................... H04W 48/18
2019/0289531 A1\* 9/2019 Takahashi ............. H04W 72/10

\* cited by examiner

```
SystemInformationBlockType1 ::=    SEQUENCE {
    cellAccessRelatedInfo              SEQUENCE {
        plmn-IdentityList                  PLMN-IdentityList,
        trackingAreaCode                   TrackingAreaCode,
        cellIdentity                       CellIdentity,
        cellBarred                         ENUMERATED {barred, notBarred},
        intraFreqReselection               ENUMERATED {allowed, notAllowed},
        csg-Indication                     BOOLEAN,
        csg-Identity                       CSG-Identity       OPTIONAL  -- Need OR
    },
    ......
}
```

FIG. 1

| csg-Indication | CSG-Indication-Index, |

FIG. 3

| csg-Indication | CSG-Indication-Bitmap, |
| CSG-Indication-Bitmap | BIT STRING (SIZE (N)), |

FIG. 4

| csg-Indication | CSG-Indication-Index, |
| csg-Identity | CSG-Identity-List, |
| CSG-Identity-List ::= | SEQUENCE (SIZE (1..*N*)) OF CSG-Identity, |

FIG. 5

| csg-Indication | CSG-Indication-Bitmap, |
| csg-Identity | CSG-Identity-List, |

FIG. 6

| (csg-Indication, csg-Identity) | (CSG-Indication-Index, CSG-Identity-List), |

FIG. 7

| (csg-Indication, csg-Identity) | (CSG-Indication-Bitmap, CSG-Identity-List), |

FIG. 8

| plmn-IdentityList-CSGInfo | PLMN-IdentityList-CSGInfo, |

FIG. 9

| PLMN-IdentityList-CSGInfo | pairs of (PLMN identity, (one or more) csg-Indication), |

FIG. 10

| csg-Identity | CSG-Identity-List, |

FIG. 11

| PLMN-IdentityList-CSGInfo | pairs of (PLMN identity, (one or more) csg-Indication, CSG-Identity-List), |

FIG. 12

| PLMN-IdentityList-CSGInfo | pairs of (PLMN identity, pairs of (csg-Indication, CSG-Identity-List)), |

FIG. 13

| cellBarred-5GC | ENUMERATED {barred, notBarred}, |
| cellBarred-EPC | ENUMERATED {barred, notBarred}, |
| cellBarred-NSA | ENUMERATED {barred, notBarred}, |

FIG. 16

| cellBarred-index-N | ENUMERATED {case1, case2, case3, ..., case$2^N$}, |

FIG. 17

| cellBarred-bitmap-N | BIT STRING (SIZE (N)), |

FIG. 18

| cellBarred-flag-1 | ENUMERATED {barred, notBarred}, |
| cellBarred-flag-2 | ENUMERATED {barred, notBarred}, |

FIG. 19

| plmn-IdentityList-CellBarredInfo | PLMN-IdentityList-CellBarredInfo, |
| PLMN-IdentityList-CellBarredInfo | pairs of (PLMN IDs, cellBarred-index-N), |
| cellBarred-index-N | ENUMERATED {case1, case2, case3, ..., case2$^N$}, |

FIG. 20

| plmn-IdentityList-CellBarredInfo | PLMN-IdentityList-CellBarredInfo, |
| PLMN-IdentityList-CellBarredInfo | pairs of (PLMN IDs, cellBarred-bitmap-N), |
| cellBarred-bitmap-N | BIT STRING (SIZE (N)), |

FIG. 21

| plmn-IdentityList-CellBarredInfo | PLMN-IdentityList-CellBarredInfo, |
| PLMN-IdentityList-CellBarredInfo | pairs of (PLMN IDs, cellBarred-flag-1, cellBarred-flag-2, cellBarred-flag-3, ..., and cellBarred-flag-N), |
| cellBarred-flag-1 | ENUMERATED {barred, notBarred}, |
| cellBarred-flag-2 | ENUMERATED {barred, notBarred}, |

FIG. 22

(csg-Indication, cellBarred-index-N)    (CSG-Indication-Index, cellBarred-index-N),

FIG. 23

(csg-Indication, cellBarred-bitmap-N)    (CSG-Indication-Index, cellBarred-bitmap-N),

FIG. 24

(csg-Indication, cellBarred-flag-x)    (CSG-Indication-Index, cellBarred-flag-x),

FIG. 25

(csg-Indication, cellBarred-index-N)    (CSG-Indication-Bitmap, cellBarred-index-N),

FIG. 26

(csg-Indication, cellBarred-index-N)    (CSG-Indication-Bitmap, {cellBarred-index-N, cellBarred-index-N, cellBarred-index-N, ..., cellBarred-index-N}),

FIG. 27

(csg-Indication, cellBarred-bitmap-N)    (CSG-Indication-Bitmap, cellBarred-bitmap-N),

FIG. 28

(csg-Indication, cellBarred-bitmap-N)    (CSG-Indication-Bitmap, {cellBarred-bitmap-N, cellBarred-bitmap-N, cellBarred-bitmap-N, ..., cellBarred-bitmap-N}),

FIG. 29

(csg-Indication, cellBarred-flag-x)    (CSG-Indication-Bitmap, cellBarred-flag-x),

FIG. 30

(csg-Indication, cellBarred-flag-x)    (CSG-Indication-Bitmap, {cellBarred-flag-x, cellBarred-flag-x, cellBarred-flag-x, ..., cellBarred-flag-x}),

FIG. 31

(csg-identity, cellBarred-index-N)    (CSG-Identity-List, cellBarred-index-N),

FIG. 32

(csg-identity, cellBarred-index-N)    (CSG-Identity-List, {cellBarred-index-N, cellBarred-index-N, cellBarred-index-N, ..., cellBarred-index-N}),

FIG. 33

(csg-identity, cellBarred-bitmap-N)    (CSG-Identity-List, cellBarred-bitmap-N),

FIG. 34

(csg-identity, cellBarred-bitmap-N)    (CSG-Identity-List, {cellBarred-bitmap-N, cellBarred-bitmap-N, cellBarred-bitmap-N, ..., cellBarred-bitmap-N}),

FIG. 35

(csg-identity, cellBarred-flag-x)    (CSG-Identity-List, cellBarred-flag-x),

FIG. 36

(csg-identity, cellBarred-flag-x)    (CSG-Identity-List, {cellBarred-flag-x, cellBarred-flag-x, cellBarred-flag-x, ..., cellBarred-flag-x}),

FIG. 37

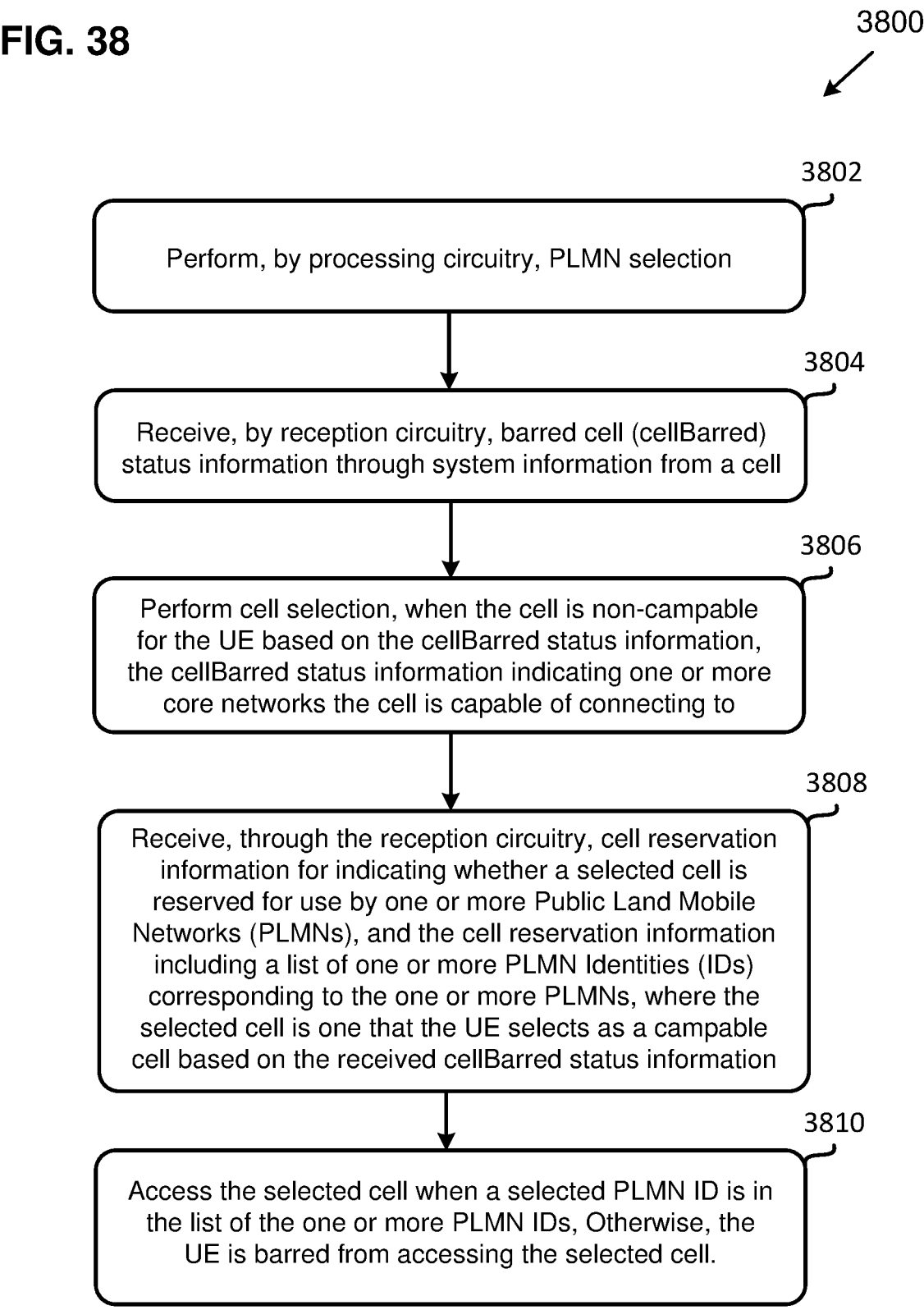

SYSTEMS AND METHODS FOR CELL (RE)SELECTION AND CELL BARRING

CROSS-REFERENCE TO RELATED APPLICATION(S)

The present application claims the benefit of and priority to a provisional U.S. Patent Application Ser. No. 62/568,885 filed on Oct. 6, 2017 entitled "METHODS AND SYSTEMS FOR CELL (RE)SELECTION WITH FLEXIBLE CSG AND CELL BARRING DESIGN," (hereinafter referred to as "US72105 application"). The disclosure of the US72105 application is hereby incorporated fully by reference into the present application.

FIELD

The present disclosure generally relates to wireless communication methods, and more particularly, systems and methods for cell (re)selection and cell barring.

BACKGROUND

In the current wireless communication networks, a Radio Access Network (RAN) or a cell of a Radio Access Technology (RAT) such as Long-Term Evolution next generation-evolved NodeB (LTE ng-eNB), evolved LTE evolved NodeB (eLTE eNB) and NR Radio Access (NR) belongs to one or more Public Land Mobile Networks (PLMNs). A PLMN may connect to one or more core networks. For example, an LTE ng-eNB may be connected to Evolved Packet Core (EPC) only, the $5^{th}$ generation core (5GC, or also known as a Next-Generation Core (NGC)) only, or both EPC and 5GC simultaneously. Moreover, a RAN/cell may be practiced with several Closed Subscriber Groups (CSGs). A RAN/cell may also belong to the private networks. It is important that during PLMN selection and cell (re)selection, the UE may camp on or (re)selects an acceptable cell or a suitable cell, which satisfies the UE's CSG requirements, PLMN requirements, and core network requirements, etc. Therefore, appropriate configurations on CSG and cell barring may be necessary to the next generation cellular networks.

Thus, there is a need in the art for improved CSG and cell barring configurations for the next generation wireless communication networks.

SUMMARY

The present disclosure is directed to systems and methods for cell (re)selection and cell barring.

In a first aspect of the present disclosure, a user equipment (UE) is described, the UE comprising: one or more non-transitory computer-readable media having computer-executable instructions embodied thereon; at least one processor coupled to the one or more non-transitory computer-readable media, and configured to execute the computer-executable instructions to: receive, by reception circuitry, barred cell (cellBarred) status information through system information; perform cell selection, when a cell is non-campable for the UE based on the cellBarred status information; wherein the cellBarred status information indicates one or more core networks the cell is capable of connecting to.

In an implementation of the first aspect of the present disclosure, the cell is non-campable for the UE when the UE attempts to connect through the cell to a core network that the cell is not connected to.

In another implementation of the first aspect of the present disclosure, the at least one processor is further configured to execute the computer-executable instructions to receive, by the reception circuitry, cell reservation information for indicating whether a selected cell is reserved for use by one or more Public Land Mobile Networks (PLMNs), and wherein the cell reservation information includes a list of one or more PLMN Identities (IDs) corresponding to the one or more PLMNs.

In yet another implementation of the first aspect of the present disclosure, the selected cell is the one that the UE selects as a campable cell based on the received cellBarred status information.

In yet another implementation of the first aspect of the present disclosure, when the UE's selected PLMN ID is not in the list of one or more PLMN IDs, the UE is barred from accessing the selected cell.

In yet another implementation of the first aspect of the present disclosure, the cell reservation information is provided in a system information block type 1 (SIB 1) of the system information.

In yet another implementation of the first aspect of the present disclosure, the cellBarred status information is provided in a system information block type 1 (SIB 1) of the system information.

In yet another implementation of the first aspect of the present disclosure, the one or more core networks include at least one of a 5G Core (5GC) or an Evolved Packet Core (EPC).

In a second aspect of the present disclosure, a method for a user equipment (UE) is described, the method comprising: receiving, by reception circuitry of the UE, barred cell (cellBarred) status information through system information; performing, by processing circuitry of the UE, cell selection, when a cell is non-campable for the UE based on the cellBarred status information; wherein the cellBarred status information indicates one or more core networks the cell is capable of connecting to.

In one implementation of the second aspect of the present disclosure, the cell is non-campable for the UE when the UE attempts to connect through the cell to a core network that the cell is not connected to.

In another implementation of the second aspect of the present disclosure, the method further comprises: receiving, through the reception circuitry, cell reservation information for indicating whether a selected cell is reserved for use by one or more Public Land Mobile Networks (PLMNs), and wherein the cell reservation information includes a list of one or more PLMN Identities (IDs) corresponding to the one or more PLMNs.

In yet another implementation of the second aspect of the present disclosure, the selected cell is the one that the UE selects as a campable cell based on the received cellBarred status information.

In yet another implementation of the second aspect of the present disclosure, when the UE's selected PLMN ID is not in the list of one or more PLMN IDs, the UE is barred from accessing the selected cell.

In yet another implementation of the second aspect of the present disclosure, the cell reservation information is provided in a system information block type 1 (SIB 1) of the system information.

In yet another implementation of the second aspect of the present disclosure, the cellBarred status information is provided in a system information block type 1 (SIB 1) of the system information.

In yet another implementation of the second aspect of the present disclosure, the one or more core networks include at least one of a 5G Core (5GC) or an Evolved Packet Core (EPC).

In a third aspect of the present disclosure, a base station comprising: one or more non-transitory computer-readable media having computer-executable instructions embodied thereon; at least one processor coupled to the one or more non-transitory computer-readable media, and configured to execute the computer-executable instructions to: transmit, by transmission circuitry, barred cell (cellBarred) status information through system information, wherein the cell-Barred status information indicates one or more core networks the cell is capable of connecting to; transmit, by the transmission circuitry, cell reservation information for indicating whether a cell is reserved for use by one or more Public Land Mobile Networks (PLMNs).

In one implementation of the third aspect of the present disclosure, the cell reservation information includes a list of one or more PLMN Identities (IDs) corresponding to the one or more PLMNs.

In another implementation of the third aspect of the present disclosure, at least one of the cell reservation information and the cellBarred information is provided in a system information block type 1 (SIB 1) of the system information.

In yet another implementation of the third aspect of the present disclosure, the one or more core networks include at least one of a 5G Core (5GC) or an Evolved Packet Core (EPC).

In some implantations of the first, second and third aspects of the present disclosure, the cellBarred status information includes (but not limited to) cellBarred bit implementations based on cell, PLMN, and CSG.

In some implantations of the first, second and third aspects of the present disclosure, the cellBarred status information includes (but not limited to) cellBarred bit implementations based on cell, PLMN, and CSG.

In some implantations of the first, second and third aspects of the present disclosure, the cell reservation information includes (but not limited to) information in the form of cellBarred bits that are PLMN-specific.

BRIEF DESCRIPTION OF THE DRAWINGS

Aspects of the exemplary disclosure are best understood from the following detailed description when read with the accompanying figures. Various features are not drawn to scale. Dimensions of various features may be arbitrarily increased or reduced for clarity of discussion.

FIG. 1 is an example of Information Element cellAccess-RelatedInfo of System Information Block Type 1 broadcasted by a cell.

FIG. 3 is an example of index-based csg-Indication, according to an exemplary implementation of the present application.

FIG. 4 is an example of bitmap-based csg-Indication, according to an exemplary implementation of the present application.

FIG. 5 is an example of cell-specific index-based CSG illustrating csg-Indication and csg-Identity list, according to an exemplary implementation of the present application.

FIG. 6 is an example of cell-specific bitmap-based CSG illustrating csg-Indication and csg-Identity list, according to an exemplary implementation of the present application.

FIG. 7 is an example of a cell-specific index-based CSG illustrating a pair of a csg-Indication and a csg-Identity list, according to an exemplary implementation of the present application.

FIG. 8 is an example of cell-specific bitmap-based CSG showing a pair of a csg-Indication and a csg-Identity list, according to an exemplary implementation of the present application.

FIG. 9 is an example of a PLMN-specific CSG, according to an exemplary implementation of the present application.

FIG. 10 is an example of a PLMN-specific CSG illustrating a csg-Indication per PLMN, according to an exemplary implementation of the present application.

FIG. 11 is an example of a csg-Identity list, according to an exemplary implementation of the present application.

FIG. 12 is an example of a PLMN-specific CSG illustrating a csg-Indication and a csg-Identity list per PLMN, according to an exemplary implementation of the present application.

FIG. 13 is an example of PLMN-specific CSG illustrating a pair of a csg-Indication and a csg-Identity list per PLMN, according to an exemplary implementation of the present application.

FIG. 16 is an example of flag-based cellBarred, according to an exemplary implementation of the present application.

FIG. 17 is an example of cell-specific index-based cellBarred, according to an exemplary implementation of the present application.

FIG. 18 is an example of cell-specific bitmap-based cellBarred, according to an exemplary implementation of the present application.

FIG. 19 is an example of cell-specific flag-based cellBarred, according to an exemplary implementation of the present application.

FIG. 20 is an example of PLMN-specific index-based cellBarred, according to an exemplary implementation of the present application.

FIG. 21 is an example of PLMN-specific bitmap-based cellBarred, according to an exemplary implementation of the present application.

FIG. 22 is an example of PLMN-specific flag-based cellBarred, according to an exemplary implementation of the present application.

FIG. 23 is an example of CSG-specific index-based cellBarred, according to an exemplary implementation of the present application.

FIG. 24 is an example of CSG-specific bitmap-based cellBarred, according to an exemplary implementation of the present application.

FIG. 25 is an example of CSG-specific flag-based cellBarred, according to an exemplary implementation of the present application.

FIG. 26 is an example of bitmap-based CSG with index-based cellBarred, according to an exemplary implementation of the present application.

FIG. 27 is an example of bitmap-based CSG with sequential index-based cellBarred, according to an exemplary implementation of the present application.

FIG. 28 is an example of bitmap-based CSG with bitmap-based cellBarred, according to an exemplary implementation of the present application.

FIG. 29 is an example of bitmap-based CSG with sequential bitmap-based cellBarred, according to an exemplary implementation of the present application.

FIG. 30 is an example of bitmap-based CSG with flag-based cellBarred, according to an exemplary implementation of the present application.

FIG. 31 is an example of bitmap-based CSG with sequential flag-based cellBarred, according to an exemplary implementation of the present application.

FIG. 32 is an example of CSG ID with index-based cellBarred, according to an exemplary implementation of the present application.

FIG. 33 is an example of CSG ID with sequential index-based cellBarred, according to an exemplary implementation of the present application.

FIG. 34 is an example of CSG ID with bitmap-based cellBarred, according to an exemplary implementation of the present application.

FIG. 35 is an example of CSG ID with sequential bitmap-based cellBarred, according to an exemplary implementation of the present application.

FIG. 36 is an example of CSG ID with flag-based cellBarred, according to an exemplary implementation of the present application.

FIG. 37 is an example of CSG ID with sequential flag-based cellBarred, according to an exemplary implementation of the present application.

FIG. 38 is a flowchart showing a method performed by a UE, according to an exemplary implementation of the present application.

DETAILED DESCRIPTION

Figure 2:
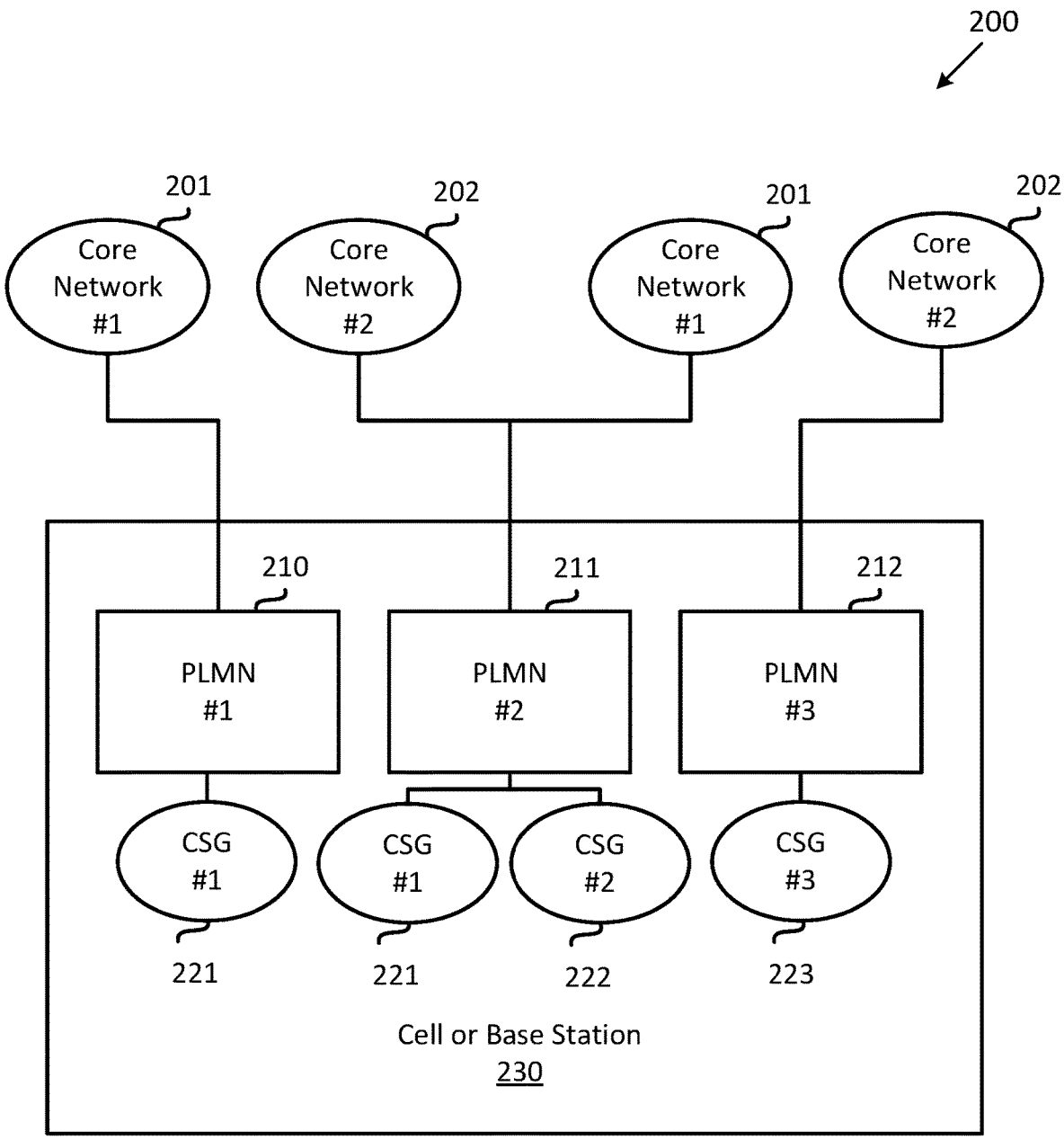
FIG. 2 is a diagram illustrating system architecture, according to an exemplary implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the exemplary figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The term "design" means "configuration" but not necessarily limited to.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules may be implemented by software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of applications specific integrated circuitry (ASIC), programmable logic arrays, and/or using one or more digital signal processor (DSPs). Although some of the exemplary implementations described in this specification are oriented to software installed and executing on computer hardware, nevertheless, alternative exemplary implementations implemented as firmware or as hardware or combination of hardware and software are well within the scope of the present disclosure.

The computer readable medium may include but is not limited to random access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., an (e)LTE system, an LTE-A system, or an LTE-Advanced Pro system) typically includes at least one base station, at least one user equipment (UE), and one or more optional network elements that provide connection towards a network. The UE communicates with the network (e.g., a core network (CN), an evolved packet core (EPC) network, an Evolved Universal Terrestrial Radio Access network (E-UTRAN), a Next-Generation Core (NGC), 5G Core Network (5GC), or an internet), through a radio access network (RAN) established by the base station. It is noted that the (e)LTE eNB (or LTE ng-eNB) is the evolution of LTE eNB that supports connectivity to EPC and/or 5GC.

It should be noted that, in the present application, a UE may include, but is not limited to, a mobile station, a mobile terminal or device, a user communication radio terminal, NB-IoT (Narrow-Band Internet-of-Things) devices, smart appliance, vehicles with V2V (Vehicle-to-Vehicle), V2X (Vehicle-to-Everything), V2P (Vehicle-to-Pedestrian), V2N (Vehicle-to-Network) and/or V2I (Vehicle-to-Infrastructure) technology, and/or smart factory equipment. For example, a UE may be a portable radio equipment, which includes, but is not limited to, a mobile phone, a tablet, a wearable device, a sensor, or a personal digital assistant (PDA) with wireless communication capability. The UE is configured to receive and transmit signals over an air interface to one or more cells in a radio access network.

FIG. 1 shows an example of Information Element (IE) cellAccessRelatedInfo of System Information Block Type 1 (SIB 1), where the cellAccessRelatedInfo IE includes parameters relevant to cell (re)selection and access, and is broadcasted by an Evolved Universal Terrestrial Radio Access (E-UTRA) cell connected to an Evolved Packet Core (EPC). Among the parameters of FIG. 1, Public Land Mobile Network (PLMN) identities (e.g., plmn-IdentityList) and cell barring (e.g., cellBarred) and Closed Subscriber Group (CSG) (e.g., csg-Indication, csg-Identity) are respectively independent information in the cell. The UEs may decide whether such cell is acceptable or suitable and whether to camp on or (re)select such cell in response to the information.

As shown in FIG. 1, the E-UTRA cell broadcasts the cellBarred parameter in the IE cellAccessRelatedInfo of SIB 1 to indicate whether such cell is barred. The cellBarred parameter may be configured with barred and notBarred values. If the cell broadcasts the cellBarred parameter with the barred value, UEs may neither camp on nor (re)select such cell. However, such configuration is static, implying that the cellBarred parameter seems to be an on/off value for this cell at that time.

Femtocells in the E-UTRAN system may constitute a CSG. As shown in FIG. 1, each cell broadcasts csg-Indication and csg-Identity in the IE cellAccessRelatedInfo of SIB 1. Moreover, csg-Indication is a Boolean parameter to inform UEs whether such cell supports CSG. If csg-Indication is set to TRUE, the UE is only allowed to access the cell if it is a CSG member cell. If the cell supports CSG, the cell further broadcasts the supported csg-Identity in the IE cellAccessRelatedInfo of SIB 1. The csg-Identity can be the identity of the CSG that the cell belongs to. If the field of csg-Identity is empty, it means that the cell does not support CSG. From the UE's perspective, the UE may camp on or (re)selects the cell with the csg-Identity, which matches the UE's CSG list (e.g., the UE's Allowed CSG List or the Operator CSG List). The CSG information is per cell configuration and unchangeable whether different PLMNs operate the cell. In addition, as shown in FIG. 1, only one CSG ID is supported by a cell. In existing CSG configurations, the CSG is cell-specific, supports only one CSG ID and unchangeable based on different PLMNs. Thus, the CSG configurations need to be more flexible for the next-generation cellular network.

FIG. 2 is a diagram illustrating a system architecture 200 for the IE cellAccessRelatedInfo of SIB 1. The system architecture 200 includes a core network #1 201, a core network #2 202, and a cell or base station 230. The cell or base station 230 is shared by a PLMN #1 210, a PLMN #2 211, a PLMN #3 212. The PLMN #1 210 is connected to the core network #1 201, and owns a CSG #1 221. The PLMN #2 211 is connected to both the core network #2 202 and the core network #1 201, and owns the CSG #1 221 and a CSG #2 222. The PLMN #3 212 is connected to the core network #2 202, and owns a CSG #3 223. In the present implementation, the cell or base station 230 may be shared by different PLMNs, and connect to different core networks at the same time. In addition, the cell or base station 230 may be shared by private networks (e.g., smart factories). A CSG may be shared by different PLMNs or by private networks. It is possible that a private network is operated by a PLMN.

FIG. 3 is an example of an index-based csg-Indication. In one implementation, csg-Indication is one bit to indicate whether the cell supports CSG capability. In another implementation, the csg-Indication is a format of CSG-Indication-Index, which may be one or more bits. In another implementation, the csg-Indication is a format of CSG-Indication-Bitmap, which may be one or more bits.

In case of one-bit CSG-Indication-Index, if the CSG represents a private network, CSG-Indication-Index indicates whether this cell is part of a private network. If the CSG represents the cell supports the predefined services or use cases, CSG-Indication-Index indicates whether such cell supports the predefined services or use cases.

In another implementation, the csg-Indication indicator (e.g., CSG-Indication-Index) may be extended to a plurality of bits and represents types of CSG definitions that the cell supports. An example with 3-bit csg-Indication is illustrated in Table 1. If there are more bits for csg-Indication, such indicator may reflect the fact that CSG concept includes more scenarios. For example, if 3-bit csg-Indication is realized, CSG concept may have at most eight definitions, identified by CSG-Indication-Index. It is possible that, as shown in Table 1, five concepts are defined and three fields are left for future use in a 3-bit csg-Indication case. One or more defined indices may be included in the csg-Indication.

TABLE 1

3-bit csg-Indications and Definitions

| CSG-Indication-Index | Definition |
| --- | --- |
| 000 | No CSG support |
| 001 | The cell is part of a private network#1 |
| 010 | The cell is part of a private network#2 |
| 011 | The cell has predefined service#1 or use case#1 |
| 100 | The cell has predefined service#2 or use case#2 |
| . . . | Null (e.g., for future extension) |

FIG. 4 shows an example of bit-map based csg-Indication. In one implementation, the csg-Indication indicator extends to a plurality of bits with a bitmap format. N-bit csg-Indication indicator means the CSG concept has N definitions. Each bit reflects whether the corresponding CSG definition is supported. In addition, it is possible that more than one CSG concepts co-exists. As illustrated in Table 2, the cell is part of a private network #2 and supports predefined service #1 or use case #1.

TABLE 2

4-bit csg-Indication (Bitmap) csg-Indication

| 1 | 0 | 0 | 1 |
| --- | --- | --- | --- |
| The cell has predefined service#1 or use case#1 | The cell has predefined service#2 or use case#2 | The cell is part of a private network#1 | The cell is part of a private network#2 |

Private network #1 and private network #2 may represent different private network types. In each of the private network types, the actual private network identities may be shown by csg-Identity. In some implementations, private network #1 and private network #2 may explicitly indicate the private network identities. The proposed implementations are not limited to any RATs such as LTE, eLTE, and NR.

The CSG information (e.g., csg-Indication and csg-Identity) announced by the cell may be cell-specific or PLMN-specific. The detailed configurations are presented in the following sections. In case that the cell supports beam operation, the proposed implementations/configurations may be applied when the CSG information is common for all beams in the same cell. The cell broadcasts CSG information in MIB (Master Information Block) and/or RMSI (Remaining System Information) by each beam, to be more specific, in each Synchronization Signal (SS)-Block (SSB).

FIG. 5 shows an example of cell-specific index-based CSG illustrating a csg-Indication and a csg-Identity list. In one implementation, the cell broadcasts one csg-Indication (e.g., CSG-Indication-Index, CSG-Indication-Bitmap) and one csg-Identity list (e.g., CSG-Identity-List). The csg-Identity list includes one or more CSG IDs (e.g., csg-Identities) to identify CSGs that the cell supports in response to the csg-Indication. The csg-Indication indicator may be one or more bits. If the csg-Indication applies the configuration illustrated in Table 1, the csg-Identity list includes one or more CSG IDs that support the indicated private network, service or use case. CSG-Identity-List includes CSG IDs corresponding to the CSG-Indication-Index.

As shown in FIG. 5, the cell may broadcast one csg-Indication which includes a plurality of CSG-Indication-Index, to announce that the cell supports many private networks and/or services and/or use cases. The CSG-Identity-List includes unique CSG IDs corresponding to all private networks and/or services and/or use cases, which are indicated by the csg-Indication. One unique CSG ID may identify one CSG for one private network, service and/or use case, and another unique CSG ID for another private network, service and/or use case. As shown in FIG. 5, it is assumed that "N" is the number of CSG IDs in the list. "N" can be defined by each cell in the CSG information. Thus, "N" can be the same or different across different cells' CSG information. A cell transmitted the CSG information through system information (e.g., MIB, SIB 1, or other SI) or dedicated signaling (e.g., RRC messages). If the CSG information is transmitted through system information, the cell may either broadcast or unicast the system information.

FIG. 6 is an example of cell-specific bitmap-based CSG illustrating a csg-Indication and a csg-Identity list. If the csg-Indication applies the bitmap configuration illustrated in Table 2, as shown in FIG. 6, the csg-Identity list includes one or more CSG IDs identifying CSGs which support the indicated private networks, services and/or use cases. The CSG IDs used in different private networks, services and/or use cases should be different in order to avoid conflicts and confusions, in case that the CSG concepts applies to the private network, services and/or use cases simultaneously. CSG-Identity-List includes CSG IDs to uniquely identify the CSGs with the types indicated by CSG-Indication-Bitmap.

FIG. 7 is an example of cell-specific index-based CSG illustrating a pair of a csg-Indication and a csg-Identity list. In one implementation, the cell broadcasts pairs of a csg-Indication (e.g., CSG-Indication-Index, CSG-Indication-Bitmap) and a csg-Identity list (e.g., CSG-Identity-List).

In some implementations, as shown in FIG. 7, CSG IDs in a list are unique to the corresponding CSG-Indication-Index in the same pair. For example, the cell broadcasts (CSG-Indication-Index #1, CSG-Identity-List #1), (CSG-Indication-Index #2, CSG-Identity-List #2), (CSG-Indication-Index #3, CSG-Identity-List #3), etc. Such configuration allows extension to more than one pairs.

FIG. 8 is an example of cell-specific bitmap-based CSG showing a pair of a csg-Indication and a csg-Identity list. As shown in FIG. 8, in one implementation, CSG IDs in a list are unique to the corresponding CSG-Indication-Bitmap in the same pair. Each CSG-Indication-Bitmap may indicate one or more private networks, services and/or use cases. The cell broadcasts (CSG-Indication-Bitmap #1, CSG-Identity-List #1), (CSG-Indication-Bitmap #2, CSG-Identity-List #2), (CSG-Indication-Bitmap #3, CSG-Identity-List #3), etc. For instance, CSG IDs in CSG-Identity-List #1 should be unique to identify the CSGs belonging to the private networks, services and use cases indicated by CSG-Indication-Bitmap #1, allowing extension to more than one pairs.

In some implementations, the CSG information (e.g., the csg-Indication and csg-Identity list) are broadcast in SIB 1 such as by E-UTRA cells, by (e)LTE cells and by LTE ng-eNBs. In some implementations, specifically, the CSG information (e.g., the csg-Indication and csg-Identity (list)) are in the cellAccessRelatedInfo of SIB 1. In some implementations, the CSG information (e.g., the csg-Indication and csg-Identity list) are broadcast in minimum System Information (SI) (e.g., SIB 1) such as by NR cells. That is, the Master Information Block (MIB) or Remaining System Information (RMSI) may broadcast the CSG information (e.g., the csg-Indication and csg-Identity list). In some implementations, only part of the CSG information (e.g., the csg-Indication) is broadcast by the minimum SI (e.g., MIB or RMSI (e.g., SIB 1)). The other CSG information (e.g., csg-Identity list) may be broadcast or unicast by other SIs. In some implementations, the cell transmits the CSG information (e.g., the csg-Indication and csg-Identity list) via dedicated signaling (e.g., RRC messages) to the UE. In some implementations, the cell transmits part of the CSG information (e.g., the csg-Indication) via system information, and the other CSG information (e.g., the csg-Identity list) via dedicated signaling (e.g., RRC messages). It is noted that, in some implementations, CSG information may include cell-specific CSG information, PLMN-specific CSG information, CSG-specific cell barred bits, etc., where the CSG information may be transmitted (e.g., broadcasted or unicasted) by a cell through system information (e.g., MIB, SIB 1, or other SI) or dedicated signaling (e.g., RRC message).

In some implementations, the UE receives the CSG information broadcast/unicast by the cell via system information (e.g., MIB, SIB 1, or other SI). In one implementation, the UE receives the CSG information during cell selection and cell reselection. It is possible that the UE receives the CSG information when the UE is in RRC_CONNECTED, RRC_INACTIVE or RRC_IDLE state.

In some implementations, the UE receiving the CSG information may know whether such cell is campable. The UE's NAS (Non-Access Stratum) may maintain the CSG information (e.g., a list of CSG ID and their associated PLMN ID on which the UE is allowed to camp and provide the list to AS). The UE's AS (Access Stratum) may report the received CSG information to the NAS. The UE's NAS selects the CSG and selects a cell belonging to the selected CSG. It is possible that the UE' AS selects the cell based on the CSG information broadcast by the cell. The UE's AS may report the selected cell and/or the corresponding CSG information to the UE's NAS. If the selected cell also supports the selected CSG, this CSG cell is a CSG member cell for the UE. It is noted that the search for available CSG(s) or cells satisfying the UE's NAS CSG requirement may be stopped on request of the UE's NAS.

In some implementations, once the UE receives the csg-Indication, the UE may know whether such cell is CSG-capable, whether such cell supports private networks, and whether such cell supports certain services and/or use cases. In some implementations, the UE may further know whether such cell supports specific private networks, services, and/or use cases if the csg-Indication may identify them. It is noted that the private networks, services and use cases are realized by several cells with CSG concept to form a closed subscribed group. Once the UE receives the csg-Identity, the UE may know a plurality of CSG IDs that the cell supports. If the broadcast/unicast CSG IDs match at least one CSG ID in the UE's stored information or CSG whitelist (e.g., in the UE's NAS), the UE may consider to camp on or (re)select this cell.

FIG. 9 shows an example of a PLMN-specific CSG. As shown in FIG. 9, the cell announces the PLMN IDs and the CSG information in the same IE (e.g., plmn-IdentityList-CSGInfo). When the plmn-IdentityList is broadcast, PLMNs on the list and the specific CSG IDs supported by each PLMN, are also broadcast. Moreover, each of the broadcast PLMNs further includes information of supporting CSG. In PLMN-IdentityList-CSGInfo, the pairs of PLMN ID, csg-Indication and (optionally) csg-Identity list are provided. The csg-Indication may be CSG-Indication-Index or CSG-Indication-Bitmap. The csg-Indication may also be one Boolean bit to indicate whether such cell supports CSG capability. In one implementation, the CSG information (e.g., csg-Indication and csg-Identity list) is per PLMN.

FIG. 10 shows a PLMN-specific CSG illustrating one or more csg-Indications per PLMN. In some implementations, the cell broadcasts PLMN ID list with the csg-Indication(s) per PLMN together. Thus, PLMN-IdentityList-CSGInfo includes the pairs of csg-Indication(s) and PLMN ID. For instance, (PLMN ID #1, csg-Indication #1), (PLMN ID #2, csg-Indication #2), and (PLMN ID #3, csg-Indication #3), etc. Such configuration enables the cell to be one of CSGs depending on the PLMNs. Here the csg-Indication may be a CSG-Indication-Index or a CSG-Indication-Bitmap to indicate the CSG concepts such as private networks, services and/or use cases, or one Boolean bit to indicate CSG capability. If a CSG-Indication-Index is adopted, in a pair, more than one csg-Indication-Index may be included. For example, (PLMN ID #1, CSG-Indication-Index #1-1, CSG-Indication-Index #1-2), (PLMN ID #2, CSG-Indication-Index #2), and (PLMN ID #3, CSG-Indication-Index #3-1, CSG-Indication-Index #3-2, CSG-Indication-Index #3-3), etc. If a CSG-Indication-Bitmap is adopted, one pair includes one PLMN ID and its corresponding CSG-Indication-Bitmap. For instance, (PLMN ID #1, CSG-Indication-Bitmap #1) and (PLMN ID #2, CSG-Indication-Bitmap #2) etc. Such configuration may reflect types of private network, services and/or use cases that are supported by the PLMNs. Each PLMN may support different private networks, services, and/or use cases. If a PLMN does not support CSG, the pair may be (PLMN ID #1, Null) or (PLMN ID #1, csg-Indication with one Boolean bit) to indicate that the PLMN does not offer support for CSGs.

If one format of the index approach such as CSG-Indication-Index with N zero bits or one format of the bitmap approach such CSG-Indication-Bitmap with N zero bits represents no CSG are supported. N is the maximum bit number of CSG-Indication-Index or CSG-Indication-Bitmap. The maximum bit number of the index approach and that of the bitmap approach may be the same or different. For example, the pair (PLMN ID #1, CSG-Indication-Index #1 with N zero bits) or (PLMN ID #1, CSG-Indication-Bitmap #1 with N zero bits) may represent no CSG support by the PLMN.

FIG. 11 shows an example of a csg-Identity list. As shown in FIG. 11, the CSG IDs may be implicitly indicated by the csg-Indication per PLMN or explicitly indicated by the csg-Identity list per cell. If the CSG IDs are indicated by the csg-Indication per PLMN, the CSG-Indication-Index and CSG-Indication-Bitmap may represent not only the CSG concepts such as private networks, services or use cases, but also the CSG IDs for the specific CSG concepts. If the CSG IDs are indicated by the csg-Identity list per cell, the cell broadcasts the CSG IDs that the cell supports based on the indicated CSG concepts. The CSG-Identity-List includes the CSG IDs that uniquely identify all the CSGs supported by all PLMNs.

FIG. 12 shows a PLMN-specific CSG illustrating a csg-Indication and a csg-Identity list per PLMN. As shown in FIG. 12, in some implementations, the cell broadcasts the PLMN ID list together with the supported corresponding one or more csg-Indication (e.g., CSG-Indication-Index, CSG-Indication-Bitmap) and one csg-Identity list (e.g., CSG-Identity-List). That is, PLMN-IdentityList-CSGInfo includes pairs of PLMN ID, csg-Indication, and csg-Identity list. When the CSG-Indication-Index is adopted, one or more CSG-Indication-Index(ices) may be supported per PLMN (e.g., (PLMN ID #1, CSG-Indication-Index #1, CSG-Identity-List #1), (PLMN ID #2, CSG-Indication-Index #2-1, CSG-Indication-Index #2-2, CSG-Identity-List #2), etc.).

In some implementations, the CSG IDs in the CSG-Identity-List per PLMN may uniquely identify the CSGs supported per PLMN. If the CSG-Indication-Bitmap is adopted, per PLMN may have its own CSG-Indication-Bitmap and CSG-Identity-List. For example, (PLMN ID #1, CSG-Indication-Bitmap #1, CSG-Identity-List #1), etc. It is noted that the CSG IDs in the CSG-Identity-List per PLMN may uniquely identify the CSGs supported per PLMN. In some implementations, when csg-Indication only has one Boolean bit to indicate its CSG capability per PLMN, the cell may broadcast (PLMN ID #1, CSG-Indication #1 with one Boolean bit, CSG-Identity-List #1). The CSG-Identity-List may be null or empty if the PLMN does not support CSGs. If the PLMN supports CSGs, the CSG-Identity-List includes all CSG IDs supported by the PLMN.

FIG. 13 is an example of PLMN-specific CSG illustrating a pair of a csg-Indication and a csg-Identity list per PLMN. As shown in FIG. 13, in some implementations, if the CSG-Indication-Index is adopted, the implementations may be (PLMN ID #1, (CSG-Indication-Index #1-1, CSG-Identity-List #1-1), (CSG-Indication-Index #1-2, CSG-Identity-List #1-2)). The CSG IDs in each CSG-Identity-List uniquely identifies the paired corresponding CSG-Indication-Index, e.g., CSG-Indication-Index #1-1 and CSG-Identity-List #1-1. If the CSG-Indication-Bitmap is adopted, the implementations may be (PLMN ID #1, (CSG-Indication-Bitmap #1-1, CSG-Identity-List #1-1), (CSG-Indication-Bitmap #1-2, CSG-Identity-List #1-2)). The CSG IDs in each CSG-Identity-List uniquely identifies the paired corresponding CSG-Indication-Bitmap, e.g., CSG-Indication-Bitmap #1-1 and CSG-Identity-List #1-1.

In some implementations, the CSG information (e.g., the csg-Indication and csg-Identity list per PLMN) are broadcast in SIB 1 by the cell/eNB such as E-UTRA cells, (e)LTE cells and LTE ng-eNBs. In some implementations, the PLMN-IdentityList-CSGInfo is in the cellAccessRelatedInfo of SIB 1. The csg-Indication per PLMN and csg-Identity (per PLMN or per cell) are in the cellAccessRelatedInfo of SIB 1. In some implementations, the PLMN-IdentityList-CSGInfo is broadcast in minimum SI such as by NR cells.

In some implementations, the PLMN-IdentityList-CSGInfo is broadcast or unicast in other SI by the cell. In some implementations, part of the CSG information is broadcast or unicast through system information, while the other CSG information is transmitted via dedicated signaling (e.g., RRC messages) by the cell.

In some implementations, the CSG information (e.g., csg-Indication per PLMN and csg-Identity list (per PLMN or per cell)) are broadcast in minimum SI. That is, the broadcast MIB or RMSI (SIB 1) may include the csg-Indication per PLMN and csg-Identity list (per PLMN or per cell). In some implementations, only the csg-Indication per PLMN is broadcast in the minimum SI (e.g., MIB or RMSI (SIB 1)). The csg-Identity list (per PLMN or per cell) may be broadcast in other SIs.

In some implementations, once the UE receives the csg-Indication per PLMN, the UE may know whether such cell is CSG-capable per PLMN, whether such cell supports private networks per PLMN, and whether such cell supports certain services and/or use cases per PLMN. When the UE performs PLMN selection, the UE may further consider whether the selected PLMN provides the required CSG information. In some implementations, the UE may further know whether such cell supports specific private networks per PLMN, services per PLMN, and/or use cases per PLMN if the csg-Indication may identify them. It is noted that each PLMN may have its own private networks, services and use cases, which are realized by several cells with CSG concept to form a closed subscribed group. Once the UE receives the csg-Identity, the UE may know a plurality of CSG IDs that the cell supports per PLMN. If the broadcast CSG IDs match at least one CSG ID in the UE's stored information or CSG whitelist per PLMN (e.g., in the UE NAS), the UE may consider to camp on or (re)select this cell. If not, the UE may continue perform cell (re)selection.

In some implementations, when the UE with CSG requirements performs PLMN selection, on each carrier, the UE at least searches for the strongest cell and read its system information. For the UE Access Stratum (AS) to know the required CSG information and PLMN information for PLMN selection and cell (re)selection, the UE NAS may notify the UE AS of the CSG information/requirement and PLMN information, which are supported by the UE. It is possible that the UE AS may utilize the stored information (e.g., in the UE's NAS or in the UE's AS) such as CSG information/requirement and PLMN information. In some implementations, the UE AS reports all the CSG information and PLMN information to the UE NAS, and the UE NAS classifies whether the cell is suitable/acceptable for camping on or (re)selecting based on the consolidation of CSG information, PLMN information and cell quality information from the UE AS. Several implementations are given to show how the UE AS reports to the UE NAS. The UE AS reports PLMN IDs with csg-Indication, or PLMN IDs with csg-Indication, which matches the UE's CSG requirements, or PLMN IDs with csg-Identity, which matches the UE's CSG requirements, to the UE NAS. The UE AS may also report the PLMN IDs together with PLMN-specific csg-Indication and/or csg-Identity which satisfy the UE's CSG requirements, to the UE NAS.

In some implementations, the UE AS only reports the PLMN IDs whose corresponding csg-Indication satisfies the UE's CSG requirements, or the PLMN IDs whose corresponding csg-Indication and csg-Identity both satisfy the UE's CSG requirements, to the UE NAS. It is possible that the strongest cell on one carrier cannot satisfy UE's CSG requirements. In such case, the UE continues to search for the next strongest cell which satisfies the UE's CSG requirements, read its system information, and report the satisfied PLMN IDs together with PLMN-specific csg-Indication and/or csg-Identity which satisfy the UE's CSG requirements, to the UE NAS. In some implementations, the UE AS only reports the PLMN IDs whose corresponding csg-Indication satisfies the UE's CSG requirements, or the PLMN IDs whose corresponding csg-Indication and csg-Identity both satisfy the UE's CSG requirements.

In various implementations of the present application, the UE may receive cellBarred status information including (but not limited to) cellBarred bit based on cell, PLMN, and CSG. The cellBarred status information may be provided by broadcast (e.g., MIB, SIB 1, or other SI) or dedicated signaling (e.g., RRC messages).

Figure 14:
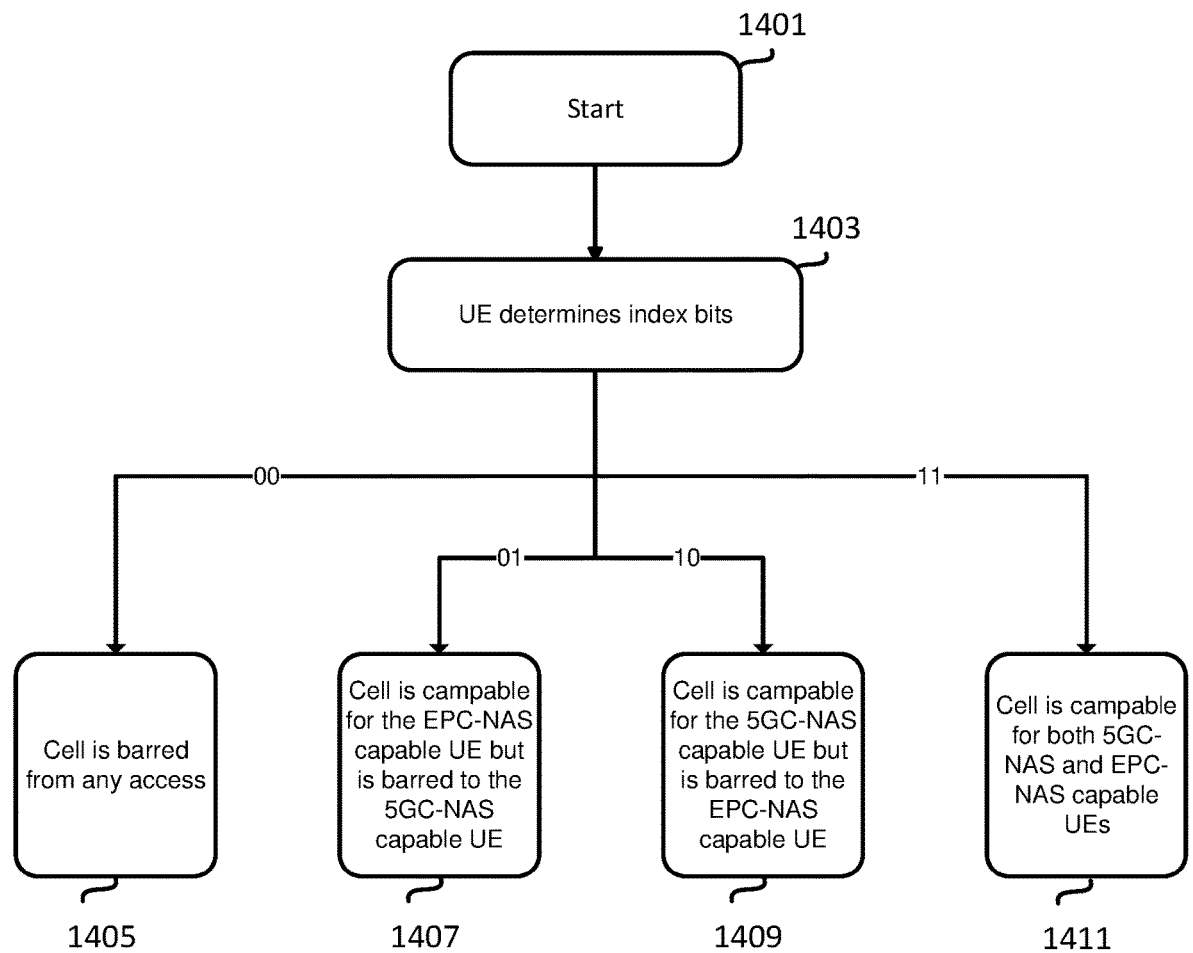
FIG. 14 is a flowchart of a method using a cellBarred index bit, according to an exemplary implementation of the present application.

FIG. 14 is a flowchart of a method using an index-based cellBarred bit, according to an example implementation of the present application. In FIG. 14, the index-based cellBarred method is used to determine whether a UE's access to a cell is barred due to the core networks e.g., 5GC and EPC, and/or whether the cell is campable or non-campable. For example, the cell with cellBarred-5GC may not apply to UEs with 5GC-capable only. The cellBarred-EPC may not apply to UEs with EPC-capable only. It is noted that the proposal may also apply to the inverse definition, e.g., the cell with cellBarred-5GC may not apply to UEs with EPC-capable only. The cellBarred-EPC may not apply to UEs with 5GC-capable only. In some implementations, the cellBarred-CNname bit is used to bar certain Core Network-capable UEs (CN-capable UEs). Another aspect of the cellBarred bit is to determine whether such cell is campable. If a cell is non-campable, the UE cannot camp on this cell. For example, some cells serving as the secondary node may not be camped by the UEs directly.

FIG. 14 shows a two-bit index-based cellBarred, according to an example implementation of the present application. As shown in Table 3, four indexed cases of cell being barred are defined. In action 1401, the determination process is initiated.

In action 1403, if the UE determines that the cellBarred bits are 00, the process proceeds to action 1405 and the cell is barred from connecting the core networks regardless of any reasons to connect, e.g., RAN overload. Such cell is not allowed to be camped and/or (re)selected by a UE, which receives the cellBarred bits. For instance, the cell configured to operate as the secondary node only may be regarded as non-campable.

For example, when the 5G deployment option 4 is considered, where the NR cell connects to the NextGen Core and the eLTE eNB serves as the secondary node, the eLTE eNB may set the cellBarred bit to 00. Considering the 5G deployment option 3 where the LTE eNB connects to the EPC and NR cell/gNB serves as the secondary node, the NR cell may set the cellBarred bit to 00.

For example, when the 5G deployment option 7 where the eLTE cell connects to the NextGen Core and NR cell/gNB serves as the secondary node, the NR cell may set the cellBarred bit to 00. For the eLTE eNB in option 4 and the NR cell/gNB in option 3 and option 7, these cells/eNBs/gNBs may be regarded as non-standalone (NSA) cell. Thus, cellBarred bit 00 may be used by NSA cells. It is noted that even though a cell broadcasts the cellBarred bit 00 implying that such cell cannot be camped on or (re)selected, the cell may connect to the EPC and/or NextGen Core, etc. In another implementation, the cellBarred bits 00 indicates the cell is not campable due to RAN overload and/or CN (Core Network) overload, e.g., any node/entity in the CN such as MME (Mobility Management Entity)/AMF (Access and Mobility Function)/SMF (Session Management Function)/UPF (User Plane Function) is overloaded.

TABLE 3

2-bit Index-based cellBarred

| Index-based cellBarred bits | Definition |
| --- | --- |
| 00 | The cell is non-campable, no matter the core network it connects to |
| 01 | The cell is campable for the EPC-NAS capable UE. The cell is barred to the 5GC-NAS capable UE. |
| 10 | The cell is campable for the 5GC-NAS capable UE. The cell is barred to the EPC-NAS capable UE. |
| 11 | The cell is campable for both the 5GC-NAS capable UE and EPC-NAS capable UE. |

In action 1407, if the UE determines that the cellBarred bits are 01, the cell is barred to the 5GC-NAS capable UEs and not barred to the EPC-NAS capable UEs. The reason may be (but not limited to) that the cell connects to the EPC only so that the UE with 5GC-NAS capability cannot camp on or (re)select this cell and considers this cell is barred. It is noted that if the UE is both EPC-NAS capable and 5GC-NAS capable, the UE considers that the cell is barred if the UE chooses to be 5GC-NAS capable. If the UE is both EPC-NAS capable and 5GC-NAS capable, the UE determines that the cell is campable if the UE chooses to be EPC-NAS capable.

In action 1409, if the UE determines that the cellBarred bits are 10, the cell is barred to the EPC-NAS capable UEs and not barred to the 5GC-NAS capable UEs. The reason may be (but not limited to) that the cell connects to the 5GC only so that the UE with EPC-NAS capability cannot camp on or (re)select this cell and considers this cell is barred. If the UE is both EPC-NAS capable and 5GC-NAS capable, the UE determines that the cell is barred if the UE chooses to be EPC-NAS capable. If the UE is both EPC-NAS capable and 5GC-NAS capable, the UE determines that the cell is campable if the UE chooses to be 5GC-NAS capable.

In action 1411, if the UE determines that the cellBarred bits are 11, the cell is determined to be not barred to the EPC-NAS capable UEs and 5GC-NAS capable UEs. The cell is campable and may be (re)selected to both the EPC-NAS capable UEs and 5GC-NAS capable UEs. The reason may be (but not limited to) that the cell connects to both the 5GC and EPC.

Furthermore, additional one bit may be added to distinguish the reason of non-campability. For instance, one additional bit is added (e.g., 1) in the beginning, so '100' means the overload situation so that the cell is non-campable; For example, '000' represents the NSA case so that the cell is non-campable. If the additional bits are introduced to distinguish the reasons of non-campability, it allows the index-based cellbarred bits to be the same number of bits or different number of bits. Table 3 shows the same number of bits, e.g., 2. It should be noted that the cellBarred bits assigned to each case above are for illustration purpose only, and can be reassigned. The extension of Table 3 may be that 1100, 000, 01, 10, 111, where the reason of non-campability is further elaborated. Note that the additional bit can be added in the end of the index-based cellBarred bits to distinguish the cause of cell barring.

The index-based cellBarred may be extended to have a plurality of bits considering more barring cases such as (but not limited to) more core networks the cell connects to. In some implementations, a three-bit index-based cellBarred is used to identify four barring cases. Thus, some indices are left for further use and extension as shown in Table 4.

TABLE 4

3-bit Index-based cellBarred

| Index-based cellBarred bits | Definition |
| --- | --- |
| 000 | The cell is non-campable, no matter the core network it connects to. |
| 001 | The cell is campable for the EPC-NAS capable UE. The cell is barred to the 5GC-NAS capable UE. |
| 010 | The cell is campable for the 5GC-NAS capable UE. The cell is barred to the EPC-NAS capable UE. |
| 011 | The cell is campable for both the 5GC-NAS capable UE and EPC-NAS capable UE. |
| 100 | Null (e.g., for future extension) |
| 101 | Null (e.g., for future extension) |
| 110 | Null (e.g., for future extension) |
| 111 | Null (e.g., for future extension) |

Figure 15:
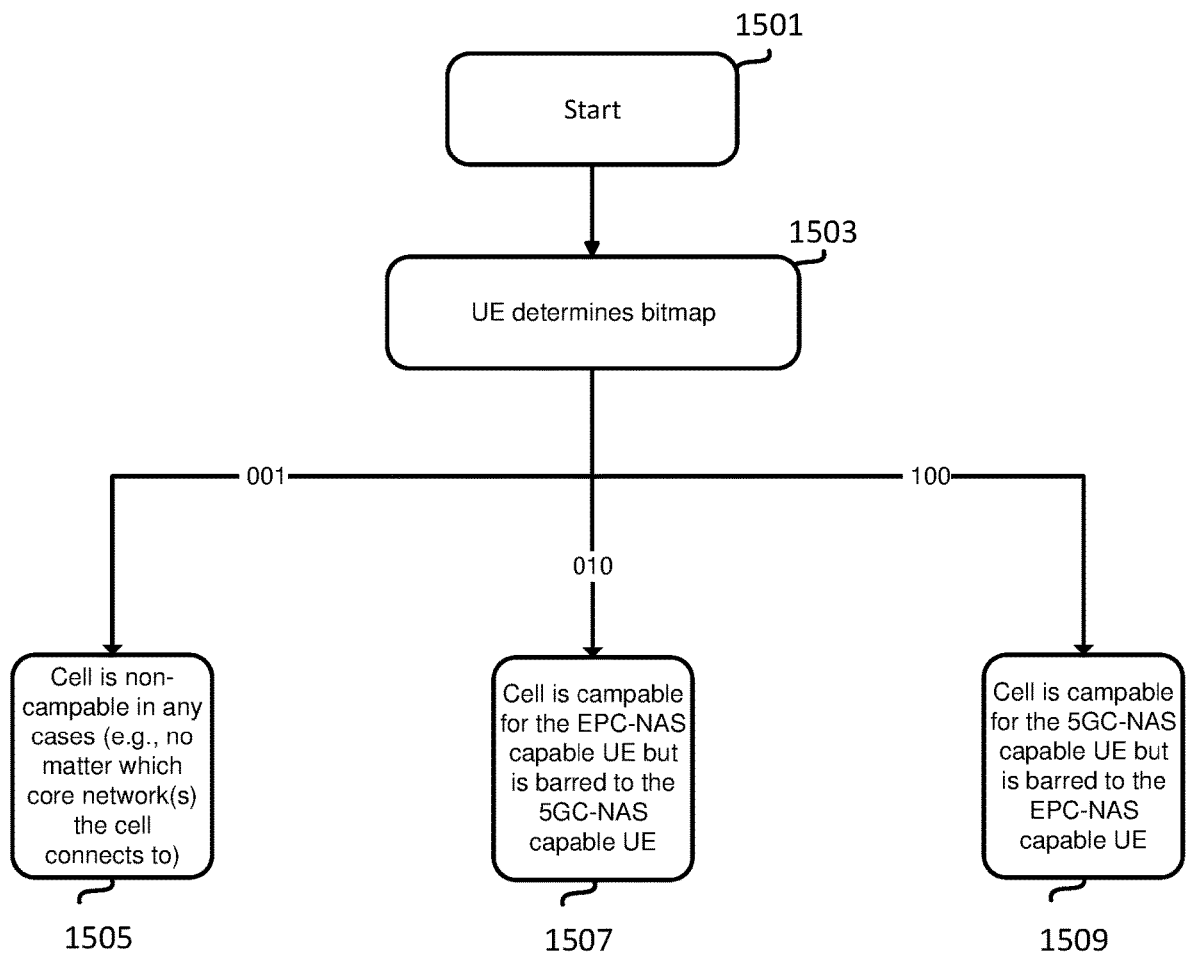
FIG. 15 is a flowchart of an exemplary method using a cellBarred bitmap, according to an exemplary implementation of the present application.

FIG. 15 is a flowchart of a method using a cellBarred bitmap, according to an exemplary implementation of the present application. As shown in Table 5, three bitmap cases of cell being barred are defined. In action 1501, the determination process is initiated.

For example, if there are N cases considering whether the cell is barred, there are corresponding N bits and each bit may uniquely identify each case. It is possible that N barring cases are defined and more than N bits are used in the cellBarred bitmap. The extra bits are used for future extension. In some implementations, bit '1' means in the corresponding case the cell is barred, and bit '0' means in the corresponding case the cell is not barred. In some implementations, bit '0' means in the corresponding case the cell is barred, and bit '1' means in the corresponding case the cell is not barred.

In action 1503, the UE determines the bitmap. If the UE determines that the cellBarred bitmap is '001', the cell is non-campable in any cases (e.g., no matter which core network(s) the cell connects to) and/or the cell is barred in any access, and the UE proceeds to action 1505. If the cellBarred bitmap is '010', the cell is barred to the 5GC-NAS capable UE and is campable for the EPC-NAS capable UE, and the UE proceeds to action 1507. If the UE determines that the cellBarred bitmap is '100', the cell is barred to the EPC-NAS capable UE and is campable for the 5GC-NAS capable UE, and the UE proceeds to action 1509. Furthermore, if the UE determines that the cellBarred bitmap is '110', the cell is barred to the EPC-NAS capable UEs and 5GC-NAS capable UEs, but the cell is not fully non-campable. Table 5 shows the 3-bit Bitmap-based cellBarred.

TABLE 5

3-bit Bitmap-based cellBarred
CellBarred bitmap

| 0 | 0 | 1 |
| --- | --- | --- |
| The cell is barred to the EPC-NAS capable UE when bit is '1' | The cell is barred to the 5GC-NAS capable UE when bit is '1' | The cell is non-campable, no matter the core network it connects to when bit is '1' |

FIG. 16 shows an example of flag-based cellBarred, according to an example implementation of the present application. In some implementations, each flag has one bit to indicate whether the cell is barred in the case defined by the flag. This approach is more flexible since the flag may be added or removed when the cell is updated. Moreover, each flag may be announced by the cell in different approaches such as by broadcast (e.g., MIB, SIB 1, or other SI) or dedicated signaling (e.g., RRC messages). If the cell does not announce one specific flag, it may represent that such flag is not defined, or the cell is not barred corresponding to the case defined by the flag.

As shown in FIG. 16, the flag cellBarred-5GC is set to "barred", the cell is barred to the 5GC-capable UEs. If the flag cellBarred-EPC is set to "barred", the cell is barred to the EPC-capable UEs. If the flag cellBarred-NSA is set to "barred", the cell is barred as the cell is a non-standalone cell. The definition of each flag may change from cases to cases.

In some implementations, the cellBarred information (e.g., index-based cellBarred, bitmap-based cellBarred, flag-based cellBarred) announced by the cell may be cell-specific, PLMN-specific or CSG-specific. The detailed configurations are presented in the following sections. In case that the cell supports beam operation, the proposed implementations/configurations may be applied by assuming that the cellBarred information is common for all beams in the same cell. The cell broadcasts cellBarred information in MIB and/or RMSI (e.g., SIB 1) by each beam, to be more specific, in each Synchronization Signal-Block (SSB).

FIG. 17 shows an example of cell-specific index-based cellBarred, according to an example implementation of the present application. As shown in FIG. 17, the cellBarred bits are cell-specific. Each cell determines the bit number of the index N. That is, how the cell announces the cellBarred bit is based on the cell itself, irrespectively to other factors.

In some implementations, if the index-based cellBarred is applied, the cell should configure the total bit number and the definition of each index to the UE. For example, if N bits are configured, at most $2^N$ cases where the cell is barred may be uniquely identified as shown in FIG. 14. The cell may broadcast cellBarred-index-N. If it is the LTE/E-UTRA/eLTE cell, cellBarred-index-N information may be in cellAccessRelatedInfo of SIB 1. If it is the NR cell, cellBarred-index-N information may be in minimum SI (e.g., MIB or SIB 1) and/or other SI (e.g., on demand SI). In some implementations, cellBarred-index-N information may be transmitted by the cell through dedicated signaling (e.g., RRC message) to the UE.

In some implementations, once the UE receives the cellBarred-index-N information from one cell, the UE AS may know whether the UE may camp on or (re)select the cell in any case defined by the cellBarred-index-N information.

FIG. 18 is an example of cell-specific bitmap-based cellBarred, according to an exemplary implementation of the present application. As shown in FIG. 18, once the UE receives the cellBarred-index-N information from one cell, the UE AS may know whether the UE may camp on or (re)select the cell in any case defined by the cellBarred-index-N information.

In some implementations, if the bitmap-based cellBarred is applied, the cell should configure the total bit number (e.g., N) and the definition of each bit, as shown in FIG. 18. Each bit represents whether the cell is barred in the case indicated by the corresponding bit. The cell may broadcast cellBarred-bitmap-N. If it is the LTE/E-UTRA/eLTE cell, cellBarred-bitmap-N information may be in cellAccessRelatedInfo of SystemInformationBlockType 1 (SIB 1). If it is the NR cell, cellBarred-bitmap-N information may be in minimum SI (e.g., MIB or SIB 1) and/or other SI (e.g., on demand SI). In some implementations, bitmap-based cellBarred information may be transmitted by the cell through dedicated signaling (e.g., RRC message) to the UE.

FIG. 19 shows an example of cell-specific flag-based cellBarred, according to an exemplary implementation of the present application. In some implementations, if the flag-based cellBarred is applied, the cell configures the total number of flag and at least one bit represent the flag to the UE, as shown in FIG. 19. Different from index-based cellBarred and bitmap-based cellBarred, the flags in flag-based cellBarred are independent. The number of bits to represent the flag may be different and each flag may be broadcast (e.g., in MIB, SIB 1, or other SI) or announced by dedicated signaling (e.g., RRC messages). Some flags may be conveyed by other SI (e.g., on demand SI). The cell may broadcast cellBarred-flag-X (note that X is an illustration e.g., numbering). If it is the LTE/E-UTRA/eLTE cell, cellBarred-flag-X information may be in cellAccessRelatedInfo of SystemInformationBlockType1 (SIB 1). If it is the NR cell, cellBarred-flag-X information may be in minimum SI (e.g., MIB or SIB 1) and/or other SI (e.g., on demand SI). In some implementations, cell-specific flag-based cellBarred information may be transmitted by the cell through dedicated signaling (e.g., RRC message) to the UE.

In some implementations, once the UE receives the cellBarred-flag-X information from one cell, the UE AS may know whether the UE may camp on or (re)select the cell in the case defined by the cellBarred-flag-X information.

In some implementations, the UE receives cell reservation information in the form of cellBarred bits that are PLMN-specific. Whether the cell is barred may depend on the PLMN, which operates the cell. In other words, the cell is reserved for some PLMNs' usage and is barred for some PLMNs' usage. Thus, PLMN-specific cellBarred bits may be considered as cell reservation information. For example, two PLMNs operate the same cell, but each PLMN has different core networks. Thus, the cell connects to different core networks depending on the PLMNs which operate the cell. In such scenario, the cellBarred bit of the same cell may vary depending on the PLMNs. The cell may reveal such relationship between the PLMNs and cellBarred conditions via PLMN-specific cellBarred bits. For example, the PLMN-specific cellbarred bits are broadcast together with the PLMN IDs in the minimum SI (e.g., MIB or SIB 1), or other SI. The PLMN-specific cellBarred bit may be announced from the cell to UEs via broadcast or dedicated signaling. In some implementations, PLMN-specific cellBarred bit information may be transmitted by the cell through dedicated signaling (e.g., RRC message). In some implementations, a cell transmits via dedicated signaling (e.g., RRC message) having other cells' cellBarred information (e.g., PLMN-specific cellBarred information, cell-specific cellBarred information, CSG-specific cellBarred information).

FIG. 20 shows an example of PLMN-specific index-based cellBarred, according to an exemplary implementation of the present application. In some implementations, if the index-based cellBarred is applied, the cell should configure the total bit number and the definition of each index, which may differ from PLMNs to PLMNs to the UE. For example, if $N_1$ bits are configured for PLMN 1, at most $2^{N_1}$ cases where the cell is barred may be uniquely identified if the PLMN ID is PLMN 1. If $N_2$ bits are configured for PLMN 2, at most $2^{N_2}$ cases where the cell is barred may be uniquely identified if the PLMN ID is PLMN 2. The cell may broadcast cellBarred-index-N1 together with PLMN ID 1 and cellBarred-index-N2 together with PLMN ID 2, as shown in FIG. 20. If it is the LTE/E-UTRA/eLTE cell, cellBarred-index-N information together with the corresponding PLMN ID may be in cellAccessRelatedInfo of SIB 1. For instance, cellAccessRelatedInfo information includes the plmn-IdentityList-CellBarredInfo information, which includes a list of pairs of PLMN ID and cellBarred-index-N. It is noted that the value of N is a positive integer and varies from PLMNs to PLMNs. If it is the NR cell, the plmn-IdentityList-CellBarredInfo information, which includes a list of pairs of PLMN ID and cellBarred-index-N, may be in minimum SI (e.g., MIB or SIB 1) and/or other SI (e.g., on demand SI). In some implementations, PLMN-specific index-based cellBarred information may be transmitted by the cell through dedicated signaling (e.g., RRC message).

In some implementations, the PLMNs with the same cellBarred-index-N may be grouped in the same pair to be announced by the cell via broadcast and/or dedicated signaling. For example, PLMN-IdentityList-CellBarredInfo includes (PLMN ID 1, PLMN ID 2, PLMN ID 3, cellBarred-index-N1) if the three PLMNs adopt the same cell barring configuration.

In some implementations, once the UE receives the plmn-IdentityList-CellBarredInfo information from one cell, the UE AS may know whether the UE may base on its target PLMNs and decide whether to camp on or (re)select the cell in any case defined by the cellBarred-index-N information.

FIG. 21 shows an example of PLMN-specific bitmap-based cellBarred, according to an exemplary implementation of the present application. If the bitmap-based cellBarred is applied, the cell may base on each PLMN which operates the cell to configure the total bit number (e.g., N) and the definition of each bit. Each bit represents whether the cell is barred in the case indicated by the corresponding bit. The total bit number and definition of each bit may vary from PLMNs to PLMNs. For example, if $N_1$ bits are configured for PLMN 1, at most $N_1$ cases where the cell is barred may be uniquely identified if the PLMN ID is PLMN 1. If $N_2$ bits are configured for PLMN 2, at most $N_2$ cases where the cell is barred may be uniquely identified if the PLMN ID is PLMN 2. The cell may broadcast cellBarred-bitmap-N together with the corresponding PLMN, as shown in FIG. 21. If it is the LTE/E-UTRA/eLTE cell, cellBarred-bitmap-N information together with the corresponding PLMN ID may be in cellAccessRelatedInfo of SIB 1. For instance, cellAccessRelatedInfo information includes the plmn-IdentityList-CellBarredInfo information, which includes a list of pairs of PLMN ID and cellBarred-bitmap-N. If it is the NR cell, the plmn-IdentityList-CellBarredInfo information, which includes a list of pairs of PLMN ID and cellBarred-bitmap-N, may be in minimum SI (e.g., MIB or SIB 1) and/or other SI (e.g., on demand SI). In some implementations, PLMN-specific bitmap-based cellBarred information may be transmitted by the cell through dedicated signaling (e.g., RRC message) to the UE. In some implementations, a cell transmits via dedicated signaling (e.g., RRC message) having other cells' cellBarred information (e.g., PLMN-specific cellBarred information, cell-specific cellBarred information, CSG-specific cellBarred information) to the UE.

The cell can transmit the neighboring cells' information (e.g., PLMN information, CSG information, cellBarred status information, cell reservation information) via system information or via dedicated signaling (e.g., RRC message) to the UE. It is noted that the neighboring cell's information may be at least (but not limited to) similar to the cell's information (e.g., the PLMN information, CSG information, cellBarred status information, cell reservation information) and format/structure.

In some implementations, the PLMNs with the same cellBarred-bitmap-N may be grouped in the same pair to be announced by the cell via broadcast (e.g., in MIB, SIB 1, or other SI) and/or dedicated signaling (e.g., RRC message). For example, PLMN-IdentityList-CellBarredInfo includes (PLMN ID 1, PLMN ID 2, PLMN ID 3, cellBarred-bitmap-N1) if the three PLMNs adopt the same cell barring configuration.

In some implementations, once the UE receives the plmn-IdentityList-CellBarredInfo information from one cell, the UE AS may know whether the UE may base on its target PLMNs and decide whether to camp on or (re)select the cell in any case defined by the cellBarred-bitmap-N information.

FIG. 22 is an example of PLMN-specific flag-based cellBarred, according to an exemplary implementation of the present application. As shown in FIG. 22, at least one bit is used to represent each flag. Each flag may have different bit numbers. Each flag represents whether the cell is barred in the case indicated by the corresponding bit(s). The total flag number and definition of each flag may vary from PLMNs to PLMNs. For example, if $N_1$ flags are configured for PLMN 1, at least $N_1$ cases where the cell is barred may be uniquely identified if the PLMN ID is PLMN 1. If $N_2$ bits are configured for PLMN 2, at least $N_2$ cases where the cell is barred may be uniquely identified if the PLMN ID is PLMN 2. The cell may broadcast cellBarred-flag-1, cellBarred-flag-2, cellBarred-flag-3, . . . , and cellBarred-flag-N together with the corresponding PLMN ID assuming N flags are defined by the PLMN. If it is the LTE/E-UTRA/eLTE cell, cellBarred-flag-1, cellBarred-flag-2, cellBarred-flag-3, . . . , and cellBarred-flag-N information together with the corresponding PLMN ID may be in cellAccessRelatedInfo of SIB 1. For instance, cellAccessRelatedInfo information includes the plmn-IdentityList-CellBarredInfo information, which includes a list of pairs of PLMN ID and {cellBarred flag-1, cellBarred-flag-2, cellBarred-flag-3, . . . , and cellBarred-flag-N}. If it is the NR cell, the plmn-IdentityList-CellBarredInfo information, which includes a list of pairs of PLMN ID and cellBarred-flag-1, cellBarred-flag-2, cellBarred-flag-3, . . . , and cellBarred-flag-N, may be in minimum SI (e.g., MIB or SIB 1) and/or other SI (e.g., on demand SI).

In some implementations, if the flag is cell-specific, such flag may be broadcast per cell, which means no PLMN ID information is associated to such flag. In this configuration, the mix of cell-specific flag-based cellBarred configuration and PLMN-specific flag-based cellBarred configuration coexisting to be broadcast is possible.

In some implementations, the PLMNs with the same flags (e.g., cellBarred-flag-x and cellBarred-flag-y) may be grouped in the same pair to be announced by the cell via broadcast (e.g., MIB, SIB 1, or other SI) and/or dedicated signaling (e.g., RRC messages). For example, PLMN-IdentityList-CellBarredInfo includes (PLMN ID 1, PLMN ID 2, PLMN ID 3, cellBarred-flag-x, cellBarred-flag-y) if the three PLMNs adopt the same cell barring configuration.

In some implementations, once the UE receives the plmn-IdentityList-CellBarredInfo information from one cell, the UE AS may know whether the UE may base on its target PLMNs and decide whether to camp on or (re)select the cell in any case defined by the cellBarred-flag-N information.

In some implementations, the cellBarred configuration may base on the CSG capability of the cell, CSG capability of the PLMN which operates the cell, supported CSG identity of the cell, or supported CSG identity of the PLMN which operates the cell.

For example, in the CSG capability-level cellBarred, a cell announces the CSG capability (e.g., supported private networks and/or scenarios and/or use cases) together with the cellBarred information/configuration (e.g., index-based cellBarred bits, bitmap-based cellBarred bits, flag-based cellBarred bits). Each CSG capability may correspond to the cellBarred information independently. The cellBarred configuration/information for one CSG capability (e.g., support the private network) may be different from that for another CSG capability (e.g., support use case #1). Such cellBarred configuration/information difference for different CSG capabilities may be cell-specific or PLMN-specific. Thus, as the extension of the previously described configurations (e.g., cell-specific CSG configuration and PLMN-specific CSG configuration), whenever the csg-Indication (e.g., CSG-Indication-Index and CSG-Indication-Bitmap) is announced should accompany with the cellBarred configuration/information to convey the CSG-specific cellBarred per PLMN or per cell. Some implementations are presented in the section of "CSG capability-based cellBarred."

In some implementations, a cell announces the CSG identities together with the cellBarred information/configuration (e.g., index-based cellBarred bits, bitmap-based cellBarred bits, flag-based cellBarred bits). Each CSG identity may correspond to the cellBarred information/configuration independently. The cellBarred configuration/information for one CSG identity (e.g., CSG ID #1) may be different from that for another CSG identity (e.g., CSG ID #2). Such cellBarred configuration/information difference for different CSG identities may be cell-specific or PLMN-specific. Therefore, as the extension of the previously described configurations (e.g., cell-specific CSG configuration and PLMN-specific CSG configuration), whenever the csg-Identity (e.g., one CSG ID and CSG-Identity-List) is announced should accompany with the cellBarred configuration/information to convey the CSG-specific cellBarred per PLMN or per cell. Some implementations are presented in the section of "CSG identity-based cellBarred."

Different CSG capabilities may apply to different cell-Barred information/configuration. It is possible that some CSG capabilities apply to one cellBarred configuration (e.g., flag-based cellBarred) and some CSG capabilities apply to another cellBarred configuration (e.g., bitmap-based cellBarred). In addition, it is possible that the definitions of the cellBarred configuration are different for different CSG capabilities. For example, 4-bit bitmap-based cellBarred configuration is used for one CSG capability, 2-bit bitmap-based cellBarred configuration is used for another CSG capability, and 3 flags in the flag-based cellBarred configuration is used for another CSG capability. Even though the same number of bits/flags is applied for the same cellBarred configuration, the definitions of each flag, each bit in a bitmap, and index may be different or the same.

FIG. 23 shows an example of CSG-specific index-based cellBarred, according to an exemplary implementation of the present application. As shown in FIG. 23, if CSG-Indication-Index is applied as the csg-Indication to reflect the CSG capability, at least three cellBarred configurations (e.g., index-based cellBarred, bitmap-based cellBarred, and flag-based cellBarred) may be applied to indicate the CSG capability-specific cellBarred, e.g., csg-Indication together with cellBarred. Example implementations relating to the CSG capability indicated by CSG-Indication-Index are provided.

In some implementations, when the cell announces the CSG capability, the cell announces the CSG-Indication-Index together with the corresponding index-based cell-Barred which is applicable to the indexed CSG capability, as shown in FIG. 23. For example, when the use case indicated by the CSG-Indication-Index is used, the cell becomes a non-campable cell which is indexed by index-based cellBarred. That is, any combination of CSG-Indication-Index and index-based cellBarred may be broadcast or conveyed by dedicated signaling. It is possible that one CSG-Indication-Index is accompanied with at least one cellBarred indices. It is possible that more than one CSG-Indication-Index are accompanied with at least one cellBarred indices.

FIG. 24 shows an example of CSG-specific bitmap-based cellBarred, according to an exemplary implementation of the present application. As shown in FIG. 24, when the cell announces the CSG capability, the cell announces the CSG-Indication-Index together with the corresponding bitmap-based cellBarred which is applicable to the indexed CSG capability, as shown in FIG. 24. For example, when the use case indicated by the CSG-Indication-Index is used, the cell may be barred in some cases defined by the bitmap-based cellBarred. Thus, each CSG-Indication-Index may come with the bitmap-based cellBarred to indicate the cases where the UEs with the indexed CSG capability should be barred. It is possible that at least one CSG-Indication-Index with the same barring cases are accompanied with the same bitmap-based cellBarred.

In some implementations, when the cell announces the CSG capability, the cell announces the CSG-Indication-Index together with the corresponding flag-based cellBarred which is applicable to the indexed CSG capability, as shown in FIG. 25. For example, when the use case indicated by the CSG-Indication-Index is used, the cell may be barred in some cases defined by the flag-based cellBarred. Therefore, each CSG-Indication-Index may come with the flags to indicate in what cases the UEs with such CSG capability are barred. It is possible that each CSG-Indication-Index comes with all flags where some indicate the barring and some do not. It is possible that each CSG-Indication-Index comes with flags only to show the barring cases. It is possible that at least one CSG-Indication-Index with the same barring cases are accompanied with the same flags.

FIG. 25 shows an example of CSG-specific flag-based cellBarred, according to an exemplary implementation of the present application. If CSG-Indication-Bitmap is applied as the csg-Indication to reflect the CSG capability, at least three cellBarred configurations (e.g., index-based cellBarred, bitmap-based cellBarred, and flag-based cellBarred) may be applied to indicate the CSG capability-specific cellBarred, e.g., csg-Indication together with cellBarred.

When the cell announces the CSG capability, the cell announces the CSG-Indication-Bitmap together with the corresponding index-based cellBarred which is applicable to the bitmap-based CSG capability, as shown in FIG. 26 and FIG. 27.

FIG. 26 shows an example of bitmap-based CSG with index-based cellBarred, according to an exemplary implementation of the present application. For example, when the use cases indicated by the CSG-Indication-Bitmap are used, the cell becomes a non-campable cell which is indexed by index-based cellBarred. The CSG-Indication-Bitmap is followed by at least one index for cell barring (index-based cellBarred), as shown in FIG. 26. If different CSG capabilities apply to different cell barring cases, pairs of CSG-Indication-Bitmap and index-based cellBarred are announced by the cell (e.g., either via broadcast or via dedicated signaling). Each pair includes the CSG-Indication-Bitmap and the corresponding cellBarred index(ices).

FIG. 27 shows an example of bitmap-based CSG with sequential index-based cellBarred, according to an exemplary implementation of the present application. In some implementations, the CSG-Indication-Bitmap is followed by a set of cellBarred index(ices), as shown in FIG. 27. Each cellBarred index(ices) (e.g., cellBarred-index-N) represents the cell barring cases corresponding to the CSG capability indicated by one bit of the CSG-Indication-Bitmap. One cellBarred-index-N includes at least one cellBarred index (ices).

In some implementations, when the cell announces the CSG capability, the cell announces the CSG-Indication-Bitmap together with the corresponding bitmap-based cellBarred which is applicable to the bitmap-based CSG capability, as shown in FIG. 28 and FIG. 29.

FIG. 28 shows an example of bitmap-based CSG with bitmap-based cellBarred, according to an exemplary implementation of the present application. For example, when the use cases indicated by the CSG-Indication-Bitmap are used, the cell becomes a non-campable cell which is represented by bitmap-based cellBarred. The CSG-Indication-Bitmap is followed by the bitmap-based cellBarred to indicate the cell barring cases for these CSG capabilities indicated by the CSG-Indication-Bitmap, as shown in FIG. 28. If different CSG capabilities apply to different cell barring cases, pairs of CSG-Indication-Bitmap and bitmap-based cellBarred are announced by the cell (e.g., either via broadcast (e.g., MIB, SIB 1, or other SI) or via dedicated signaling (e.g., RRC messages)). Each pair includes the CSG-Indication-Bitmap and the corresponding cellBarred bitmap(s).

FIG. 29 shows an example of bitmap-based CSG with sequential bitmap-based cell Barred, according to an exemplary implementation of the present application. In some implementations, the CSG-Indication-Bitmap is followed by a set of cellBarred bitmap(s), as shown in FIG. 26. Each cellBarred bitmap represents the cell barring cases corresponding to the CSG capability indicated by one bit of the CSG-Indication-Bitmap.

In some implementations, when the cell announces the CSG capability, the cell announces the CSG-Indication-Bitmap together with the corresponding flag-based cellBarred which is applicable to the bitmap-based CSG capability, as shown in FIG. 30 and FIG. 31.

FIG. 30 shows an example of bitmap-based CSG with flag-based cellBarred, according to an exemplary implementation of the present application. For example, when the use cases indicated by the CSG-Indication-Bitmap are used, the cell becomes a non-campable cell which is indexed by flag-based cellBarred. The CSG-Indication-Bitmap is followed by at least one flag for cell barring (flag-based cellBarred), as shown in FIG. 30. If different CSG capabilities apply to different cell barring cases, pairs of CSG-Indication-Bitmap and flag-based cellBarred are announced by the cell (e.g., either via broadcast (e.g., MIB, SIB 1, or other SI) or via dedicated signaling (e.g., RRC messages)). Each pair includes the CSG-Indication-Bitmap and the corresponding cellBarred flag(s).

FIG. 31 shows an example of bitmap-based CSG with sequential flag-based cellBarred, according to an exemplary implementation of the present application. In some implementations, the CSG-Indication-Bitmap is followed by a set of cellBarred flag(s), as shown in FIG. 31. Each cellBarred flag(s) (e.g., cellBarred-flag-x) represents the cell barring case corresponding to the CSG capability indicated by one bit of the CSG-Indication-Bitmap.

Different CSG identities may apply to different cellBarred information/configuration. It is possible that some CSG identities apply to one cellBarred configuration (e.g., flag-based cellBarred) and some CSG identities apply to another cellBarred configuration (e.g., bitmap-based cellBarred). In addition, it is possible that the definitions of the cellBarred configuration are different for different CSG identities. For example, 4-bit bitmap-based cellBarred configuration is used for CSG ID #1, 2-bit bitmap-based cellBarred configuration is used for another CSG ID #2, and 3 flags in the flag-based cellBarred configuration is used for another CSG ID #3. Even though the same number of bits/flags is applied for the same cellBarred configuration, the definitions of each flag, each bit in a bitmap, and index may be different or the same. The CSG IDs may be repetitive under the different CSG capabilities. The relationship between the CSG identities and cellBarred information/configuration are illustrated in relation to the present implementation.

In some implementations, when the cell announces the csg-identity, the cell announces the CSG-Identity-List together with the corresponding index-based cellBarred which is applicable to the CSG IDs in CSG-Identity-List, as shown in FIG. 32 and FIG. 33.

FIG. 32 shows an example of CSG ID with index-based cellBarred, according to an exemplary implementation of the present application. When the CSG IDs indicated by the CSG-Identity-List are used to camp on or (re)select the cell, the cell becomes a non-campable cell, which is indexed by index-based cellBarred. That is, any combination of CSG-Identity-List and index-based cellBarred may be broadcast or conveyed by dedicated signaling, as shown in FIG. 32. Each CSG-Identity-List may include one or more CSG IDs. It is possible that one CSG-Identity-List is accompanied with at least one cellBarred indices.

FIG. 33 shows an example of CSG ID with sequential index-based cellBarred, according to an exemplary implementation of the present application. In some implementations, the CSG-Identity-List is followed by more than one cellBarred-index-N, where each cellBarred-index-N includes at least one cellbarring index(ices), as shown in FIG. 33. Each cellBarred-index-N represents the cell barring configuration/information for one CSG ID in the CSG-Identity-List.

In some implementations, when the cell announces the csg-identity, the cell announces the CSG-Identity-List together with the corresponding bitmap-based cellBarred which is applicable to the CSG IDs in the CSG-Identity-List, as shown in FIG. 34 and FIG. 35.

FIG. 34 shows an example of CSG ID with bitmap-based cellBarred, according to an exemplary implementation of the present application. When the CSG IDs indicated by the CSG-Identity-List are used to camp on or (re)select the cell, the cell becomes a non-campable cell, which is indicated by bitmap-based cellBarred. Thus, each CSG-Identity-List may come with the bitmap-based cellBarred to indicate the cases where the UEs with the CSG IDs should be barred, as shown in FIG. 34.

FIG. 35 shows an example of CSG ID with sequential bitmap-based cellBarred, according to an exemplary implementation of the present application. In some implementations, the CSG-Identity-List is followed by more than one cellBarred-bitmap-N, where each cellBarred-bitmap-N represents the cell barring configuration/information for one CSG ID in the CSG-Identity-List, as shown in FIG. 35.

In some implementations, when the cell announces the csg-identity, the cell announces the CSG-Identity-List together with the corresponding flag-based cellBarred which is applicable to the CSG IDs in the CSG-Identity-List, as shown in FIG. 36 and FIG. 37.

FIG. 36 shows an example of CSG ID with flag-based cellBarred, according to an exemplary implementation of the present application. When the CSG IDs indicated by the CSG-Identity-List are used to camp on or (re)select the cell, the cell becomes a non-campable cell, which is indicated by flag-based cellBarred. Therefore, each CSG-Identity-List may come with the flags to indicate in what cases the UEs with such CSG IDs are barred, as shown in FIG. 36.

FIG. 37 is an example of CSGID with sequential flag-based cellBarred, according to an exemplary implementation of the present application. In each CSG-Identity-List comes with all flags where some indicate the barring and some do not. It is possible that each CSG-Identity-List comes with flags only to show the barring cases. In some implementations, the CSG-Identity-List is followed by more than one cellBarred-flag-x, where each cellBarred-flag-N includes at least one cell barring flag(s), as shown in FIG. 37. Each cellBarred-flag-N represents the cell barring configuration/information for one CSG ID in the CSG-Identity-List.

In general, if the UE fails to camp on or (re)select the cell, the UE does need to check other configurations. For example, if the UE first checks the cellBarred configuration and finds it is barred, the UE does not check the CSG configuration. If the UE first checks the CSG configuration and finds it is barred, the UE does not check the cellBarred configuration. This is the general guideline for the UE. However, since the cellBarred configuration may be conveyed in three alternatives (e.g., cell-specific cellBarred configuration, PLMN-specific cellBarred configuration, and CSG-specific cellBarred configuration) and the CSG configuration may be conveyed in two alternatives (e.g., cell-specific cellBarred configuration and PLMN-specific cellBarred configuration), the following implementations describe six cases of how to prioritize the CSG configuration and cellBarred configuration considering how they are conveyed. However, it is possible that prioritization is not necessary. Each cellBarred configuration and/or each CSG configuration may be checked during PLMN selection or cell (re)selection.

In some implementations, for a PLMN-specific CSG, the CSG configuration may be read by the UE during PLMN selection. Thus, it is highly likely that the CSG configuration is checked by the UE first, and cellBarred configuration later. Specifically, if the case is with PLMN-specific CSG configuration and cell-specific cellBarred configuration, the UE may check the CSG configuration first during PLMN selection and then the cellBarred configuration during cell (re)selection. If it is the case with PLMN-specific CSG configuration and PLMN-specific cellBarred configuration, both CSG configuration and cellBarred configuration may be checked together during PLMN selection. If it is the case with PLMN-specific CSG configuration and CSG-specific cellBarred configuration, both CSG configuration and cellBarred configuration may be checked together during PLMN selection. Within PLMN selection, for each PLMN, CSG configuration is checked first and then cellBarred configuration.

In some implementations, for a cell-specific CSG selection process, a CSG configuration may be read by the UE during PLMN selection or cell (re)selection. It is highly likely that the CSG configuration is checked firstly by the UE during PLMN selection as the LTE solution, and cellBarred configuration later. However, the details may depend on the cellBarred configuration. If the case is with cell-specific CSG configuration and cell-specific cellBarred configuration, CSG configuration is checked firstly during PLMN selection. If CSG configuration is not checked during PLMN selection, both CSG configuration and cellBarred configuration are checked during cell (re)selection. If the case is with cell-specific CSG configuration and PLMN-specific cellBarred configuration, cellBarred configuration is checked firstly during PLMN selection, optionally followed by CSG configuration check. However, it is possible that both cellBarred configuration and CSG configuration are checked during PLMN selection. If the case is with cell-specific CSG configuration and CSG-specific cellBarred configuration, CSG configuration is checked firstly and per CSG cellBarred configuration is checked later.

FIG. 38 is a flowchart 3800 showing a method performed by a UE, according to an exemplary implementation of the present application. As shown in FIG. 38, the flowchart 3800 includes actions 3802, 3804, 3806, 3808, and 3810.

In action 3802, the UE performs, by processing circuitry, PLMN selection to select one or more PLMNs.

In action 3804, the UE receives, by reception circuitry, barred cell (cellBarred) status information through system information from a cell.

In action 3806, the UE performs cell selection, when the cell is non-campable for the UE based on the cellBarred status information, the cellBarred status information indicating one or more core networks the cell is capable of connecting to.

In action 3808, the UE receives, through the reception circuitry, cell reservation information for indicating whether a selected cell is reserved for use by one or more PLMNs, and the cell reservation information including a list of one or more PLMN Identities (IDs) corresponding to the one or more PLMNs.

In action 3810, the UE is allowed to access the selected cell when a selected PLMN ID by the UE is in the list of the one or more PLMN IDs. Otherwise, the UE is barred from access the selected cell.

Figure 39:
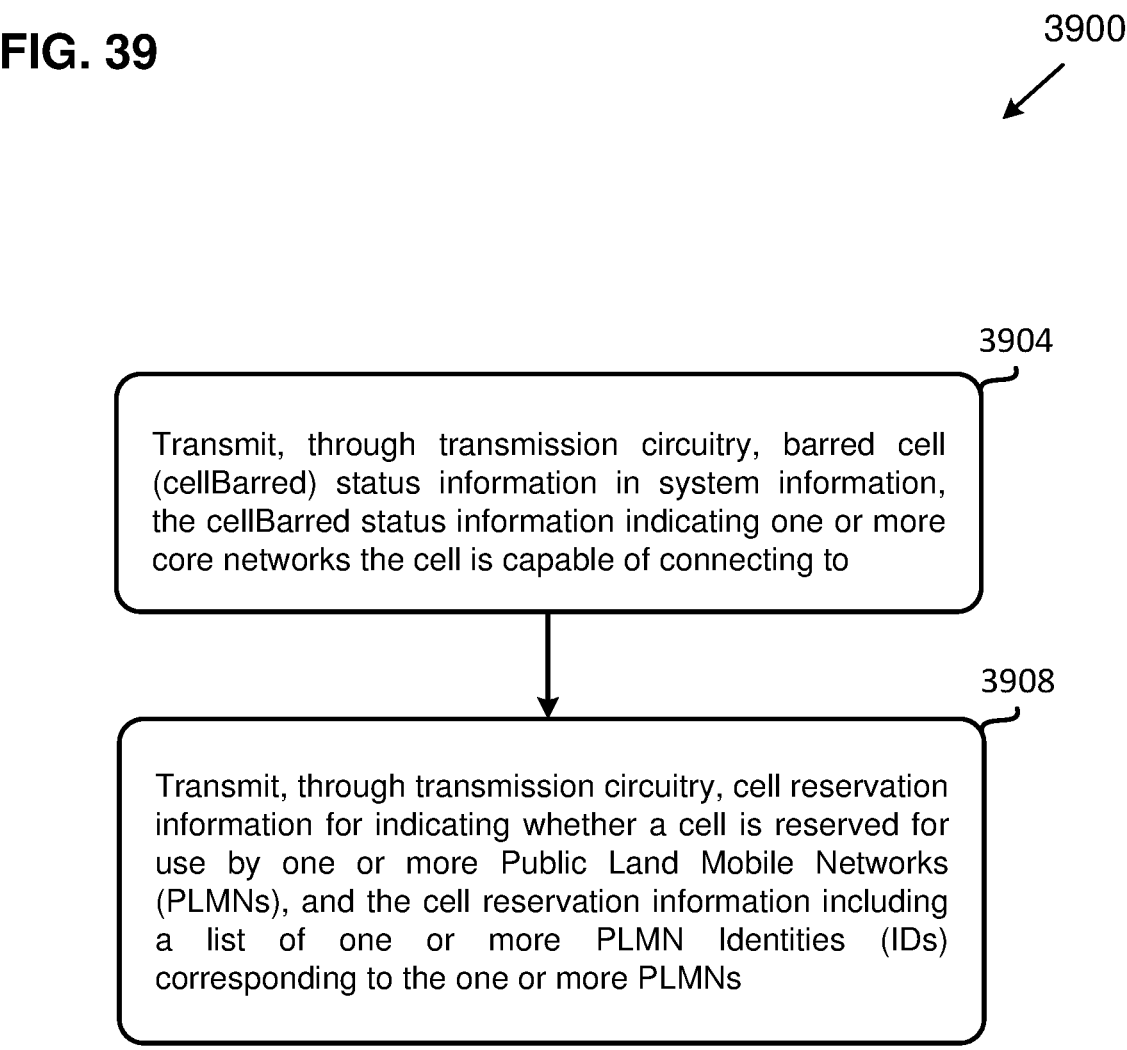
FIG. 39 is a flowchart showing a method performed by a cell or base station, according to an exemplary implementation of the present application.

FIG. 39 is a flowchart 3900 showing a method performed by a cell or a base station (e.g., gNB), according to an exemplary implementation of the present application. As shown in FIG. 39, the flowchart 3900 includes actions 3904 and 3908.

In action 3904, the cell or base station transmits, by transmission circuitry, barred cell (cellBarred) status information through system information, where the cellBarred status information indicates one or more core networks the cell is capable of connecting to.

In action 3908, the UE transmits, by transmission circuitry, cell reservation information for indicating whether a cell is reserved for use by one or more PLMNs, and the cell reservation information including a list of one or more PLMN Identities (IDs) corresponding to the one or more PLMNs.

Figure 40:
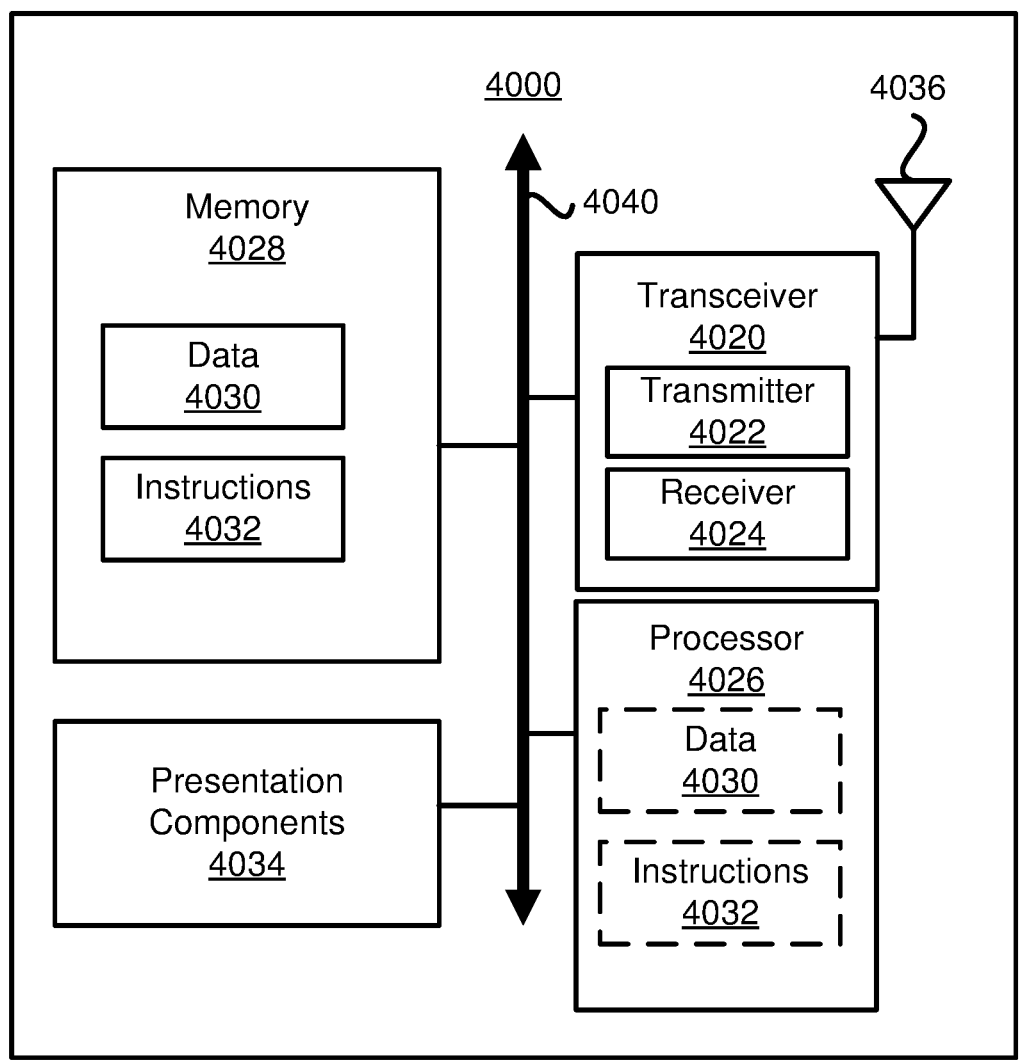
FIG. 40 is a block diagram illustrating a radio communication equipment, in accordance with an example implementation of the present application.

FIG. 40 illustrates a block diagram of a node for wireless communication, in accordance with various aspects of the present application. As shown in FIG. 40, a node 4000 may include a transceiver 4020, a processor 4026, a memory 4028, one or more presentation components 4034, and at least one antenna 4036. The node 4000 may also include an RF spectrum band module, a base station communications module, a network communications module, and a system communications management module, input/output (I/O) ports, I/O components, and power supply (not explicitly shown in FIG. 40). Each of these components may be in communication with each other, directly or indirectly, over one or more buses 4040. In one implementation, the node 4000 may be a UE or a base station that performs various functions described herein, for example, with reference to FIGS. 1 through 39.

The transceiver 4020 having a transmitter 4022 (e.g., transmitting/transmission circuitry) and a receiver 4024 (e.g., receiving/reception circuitry) may be configured to transmit and/or receive time and/or frequency resource partitioning information. In some implementations, the transceiver 4020 may be configured to transmit in different types of subframes and slots including, but not limited to, usable, non-usable and flexibly usable subframes and slot formats. The transceiver 4020 may be configured to receive data and control channels.

The node 4000 may include a variety of computer-readable media. Computer-readable media can be any available media that can be accessed by the node 4000 and include both volatile (and non-volatile) media and removable (and non-removable) media. By way of example, and not limitation, computer-readable media may comprise computer storage media and communication media. Computer storage media may include both volatile (and non-volatile) and removable (and non-removable) media implemented according to any method or technology for storage of information such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not include a propagated data signal. Communication media typically may embody computer-readable instructions, data structures, program modules or other data in a modulated data signal such as a carrier wave or other transport mechanism and includes any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 4028 may include computer-storage media in the form of volatile and/or non-volatile memory. The memory 4028 may be removable, non-removable, or a combination thereof. Exemplary memory may include solid-state memory, hard drives, optical-disc drives, etc. As illustrated in FIG. 40, the memory 4028 may store computer-readable, computer-executable instructions 4032 (e.g., software codes) that are configured to, when executed, cause the processor 4026 to perform various functions described herein, for example, with reference to FIGS. 1 through 39. Alternatively, the instructions 4032 may not be directly executable by the processor 4026 but be configured to cause the node 4000 (e.g., when compiled and executed) to perform various functions described herein.

The processor 4026 (e.g., having processing circuitry) may include an intelligent hardware device, e.g., a central processing unit (CPU), a microcontroller, an ASIC, etc. The processor 4026 may include memory. The processor 4026 may process the data 4030 and the instructions 4032 received from the memory 4028, and information through the transceiver 4020, the base band communications module, and/or the network communications module. The processor 4026 may also process information to be sent to the transceiver 4020 for transmission through the antenna 4036, to the network communications module for transmission to a core network.

One or more presentation components 4034 may present data indications to a person or other device. Exemplary presentation components 4034 may include a display device, speaker, printing component, vibrating component, etc.

From the above description, it is clear that various techniques may be used for implementing the concepts described in the present disclosure without departing from the scope of those concepts. Moreover, while the concepts have been described with specific reference to certain implementations, a person of ordinary skill in the art would recognize that changes may be made in form and detail without departing from the scope of those concepts. As such, the described implementations are to be considered in all respects as illustrative and not restrictive. It should also be understood that the present disclosure is not limited to the particular implementations described, but many rearrangements, modifications, and substitutions are possible without departing from the scope of the present disclosure.

What is claimed is:

1. A user equipment (UE) comprising:
one or more non-transitory computer-readable media having computer-executable instructions embodied thereon;
at least one processor coupled to the one or more non-transitory computer-readable media, and configured to execute the computer-executable instructions to:
receive, by reception circuitry, barred cell (cellBarred) status information through system information from a cell connected to a fifth generation core (5GC);
determine, before selecting the cell, whether the cell is non-campable for the UE, based on the cellBarred status information received from the cell; and
perform cell selection of another cell, after it is determined that the cell is non-campable for the UE,
wherein the cellBarred status information comprises information regarding the 5GC and information regarding a plurality of Public Land Mobile Networks (PLMNs) operating the 5GC,
wherein the UE is not capable of connecting to an Evolved Packet Core (EPC), and
wherein the cell is determined by the UE as non-campable for the UE when the UE attempts to connect through the cell to a core network to which the cell is not connected.

2. The UE of claim 1, wherein the at least one processor is further configured to execute the computer-executable instructions to receive, by the reception circuitry, cell reservation information for indicating whether a selected cell is reserved for use by one or more of the plurality of PLMNs, and wherein the cell reservation information includes a list of one or more PLMN Identities (IDs) corresponding to the one or more of the plurality of PLMNs.

3. The UE of claim 2, wherein the selected cell is a cell that is determined by the UE as a campable cell based on the received cellBarred status information.

4. The UE of claim 2, wherein the UE is barred from accessing the selected cell when a PLMN ID selected by the UE is not in the list.

5. The UE of claim 2, wherein the cell reservation information is provided in a system information block type 1 (SIB 1) of the system information.

6. The UE of claim 1, wherein the cellBarred status information is provided in a system information block type 1 (SIB 1) of the system information.

7. A method for a user equipment (UE), the method comprising:

receiving, by reception circuitry of the UE, barred cell (cellBarred) status information through system information from a cell connected to a fifth generation core (5GC);

determining, before selecting the cell, whether the cell is non-campable for the UE, based on the cellBarred status information received from the cell; and performing cell selection of another cell, after it is determined that the cell is non-campable for the UE, wherein the cellBarred status information comprises information regarding the 5GC and information regarding a plurality of Public Land Mobile Networks (PLMNs) operating the 5GC, wherein the UE is not capable of connecting to an Evolved Packet Core (EPC), and wherein the cell is determined by the UE as non-campable for the UE when the UE attempts to connect through the cell to a core network to which the cell is not connected.

8. The method of claim 7, further comprising:
receiving, through the reception circuitry, cell reservation information for indicating whether a selected cell is reserved for use by one or more of the plurality of PLMNs, and wherein the cell reservation information includes a list of one or more PLMN Identities (IDs) corresponding to the one or more PLMNs.

9. The method of claim 8, wherein the selected cell is a cell that is determined as a campable cell based on the received cellBarred status information.

10. The method of claim 8, wherein the UE is barred from accessing the selected cell when a PLMN ID selected by the UE is not in the list.

11. The method of claim 8, wherein the cell reservation information is provided in a system information block type 1 (SIB 1) of the system information.

12. The method of claim 7, wherein the cellBarred status information is provided in a system information block type 1 (SIB 1) of the system information.

* * * * *